(12) United States Patent  (10) Patent No.: US 9,209,570 B2
Toba et al.  (45) Date of Patent: Dec. 8, 2015

(54) CONNECTOR, CABLE, TRANSMISSION DEVICE, RECEPTION DEVICE, AND MANUFACTURING METHOD OF CONNECTOR

(75) Inventors: Kazuaki Toba, Kanagawa (JP); Hideyuki Suzuki, Kanagawa (JP); Taichi Hirano, Kanagawa (JP)

(73) Assignee: Sony Corporation (JP)

(*) Notice: Subject to any disclaimer, the term of this patent is extended or adjusted under 35 U.S.C. 154(b) by 224 days.

(21) Appl. No.: 13/990,850

(22) PCT Filed: Dec. 2, 2011

(86) PCT No.: PCT/JP2011/077991
§ 371 (c)(1),
(2), (4) Date: May 31, 2013

(87) PCT Pub. No.: WO2012/077612
PCT Pub. Date: Jun. 14, 2012

(65) Prior Publication Data
US 2013/0243106 A1  Sep. 19, 2013

(30) Foreign Application Priority Data
Dec. 9, 2010 (JP) ................................. 2010-274240

(51) Int. Cl.
*H04B 3/00* (2006.01)
*H01R 13/648* (2006.01)
(Continued)

(52) U.S. Cl.
CPC .......... *H01R 13/648* (2013.01); *H01R 13/6471* (2013.01); *H01R 24/62* (2013.01);
(Continued)

(58) Field of Classification Search
CPC .. H01R 13/648; H01R 13/6471; H01R 43/26; H01R 24/62; H01R 2201/18; H01R 2107/00; H02G 15/02; Y10T 29/49204
USPC ............ 375/257, 135, 136, 156, 157; 439/55, 439/108, 490, 499, 497, 862, 101
See application file for complete search history.

(56) References Cited

U.S. PATENT DOCUMENTS
5,518,422 A  5/1996 Zell et al.
5,620,340 A  4/1997 Andrews
(Continued)

FOREIGN PATENT DOCUMENTS
CN  201191654 Y  2/2009
JP  05-0275139 A  10/1993
(Continued)

OTHER PUBLICATIONS
"HDMI Design guide", Jun. 1, 2007, pp. 1-12, XP055141455, Retrieved from the Internet: URL:http://www.google.nl/url?sa=t&rct=j&q=&esrc=s&source=web&cd=7&ved=0CFUQFJAG&url Texas Instruments HDMI Design Guide.
(Continued)

*Primary Examiner* — Dhaval Patel
(74) *Attorney, Agent, or Firm* — Lerner, David, Littenberg, Krumholz & Mentlik, LLP

(57) ABSTRACT

To provide a connector enabling high quality signal transmission while maintaining compatibility with the current HDMI connector, in a new HDMI interface using pins assigned to a shield, as a data pair. Each of signal electrode pins is arrayed near a shell (grounding conductor) so as to couple with the shell, and differential signals are transmitted with single end. A ground plane is disposed between multiple signal electrode pins of a first stage and the plurality of signal electrode pins of a second stage within a dielectric. Also, connection conductors electrically connecting the ground plane and the grounding conductor are disposed between each of the signal electrode pins of each of the stages within the dielectric. With a pair of signal electrode pins transmitting differential signals, crosstalk from other signal electrode pins can be reduced, and high quality signal transmission is enabled.

14 Claims, 31 Drawing Sheets

(51) Int. Cl.
  *H01R 24/62* (2011.01)
  *H01R 43/26* (2006.01)
  *H02G 15/02* (2006.01)
  *H01R 13/6471* (2011.01)
  *H01R 107/00* (2006.01)

(52) U.S. Cl.
  CPC .............. *H01R 43/26* (2013.01); *H02G 15/02* (2013.01); *H01R 2107/00* (2013.01); *H01R 2201/18* (2013.01); *Y10T 29/49204* (2015.01)

(56) References Cited

U.S. PATENT DOCUMENTS

| | | | |
|---|---|---|---|
| 6,280,201 B1 | 8/2001 | Morris | |
| 7,462,071 B1 * | 12/2008 | Wu | 439/607.05 |
| 2005/0162240 A1 | 7/2005 | Saitou et al. | |

FOREIGN PATENT DOCUMENTS

| | | |
|---|---|---|
| JP | 08-037059 A | 2/1996 |
| JP | 08-505732 A | 6/1996 |
| JP | 2001-250614 A | 9/2001 |
| JP | 2002185219 A | 6/2002 |
| JP | 2003-188609 A | 7/2003 |
| JP | 2005032154 A | 2/2005 |
| JP | 2005124038 A | 5/2005 |
| JP | 2005-243516 A | 9/2005 |
| JP | 2005251965 A | 9/2005 |
| JP | 2008072022 A | 3/2008 |
| JP | 2009100170 A | 5/2009 |
| JP | 2010128700 A | 6/2010 |
| JP | 2011090959 A | 5/2011 |
| WO | 2009147791 A1 | 12/2009 |

OTHER PUBLICATIONS

Partial European Search Report from EP Application No. 11847414, dated Sep. 25, 2014.

Office Action from Japanese Application No. 2010-274240, dated Sep. 9, 2014.

High-Definition Multimedia Interface Specification Version 1.4, Jun. 5, 2009; pp. i-197; Supplement 1—Consumer Electronics Control (CEC), pp. CEC i-CEC 127; Supplement 2—HDMI Ethernet and Audio Return Channel (HEAC), pp. HEAC i-HEAC 72.

CN Office Action for CN Application No. 201180059006, dated Feb. 16, 2015.

* cited by examiner

FIG. 6

(a) CURRENT HDMI PIN ASSIGNMENT
(Type-A)

| PIN | Signal Assignment |
|---|---|
| 1 | TMDS Data2+ |
| 2 | TMDS Data2 Shield |
| 3 | TMDS Data2− |
| 4 | TMDS Data1+ |
| 5 | TMDS Data1 Shield |
| 6 | TMDS Data1− |
| 7 | TMDS Data0+ |
| 8 | TMDS Data0 Shield |
| 9 | TMDS Data0− |
| 10 | TMDS Clock+ |
| 11 | TMDS Clock Shield |
| 12 | TMDS Clock− |
| 13 | CEC |
| 14 | Utility/HEAC+ |
| 15 | SCL |
| 16 | SDA |
| 17 | DDC/CEC Ground/HEAC Shield |
| 18 | +5 V Power |
| 19 | Hot Plug Detect/HEAC− |

(b) NEW HDMI PIN ASSIGNMENT

| PIN | Signal Assignment |
|---|---|
| 1 | TMDS Data0+ |
| 2 | TMDS Data4+ |
| 3 | TMDS Data0− |
| 4 | TMDS Data1+ |
| 5 | TMDS Data4− |
| 6 | TMDS Data1− |
| 7 | TMDS Data2+ |
| 8 | TMDS Data5+ |
| 9 | TMDS Data2− |
| 10 | TMDS Data3+ |
| 11 | TMDS Data5− |
| 12 | TMDS Data3− |
| 13 | CEC |
| 14 | Utility/HEAC+ |
| 15 | SCL |
| 16 | SDA |
| 17 | DDC/CEC Ground/HEAC Shield |
| 18 | +5 V Power |
| 19 | Hot Plug Detect/HEAC− |

FIG. 7
(a) CURRENT HDMI PIN ARRAY
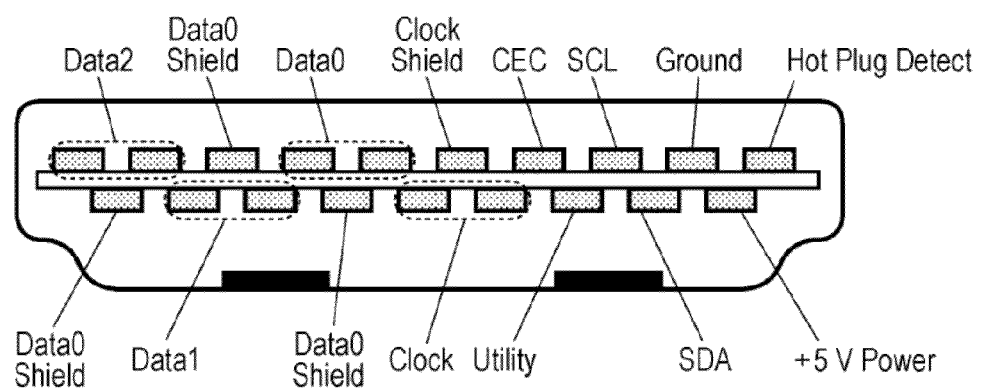
(b) NEW HDMI PIN ARRAY
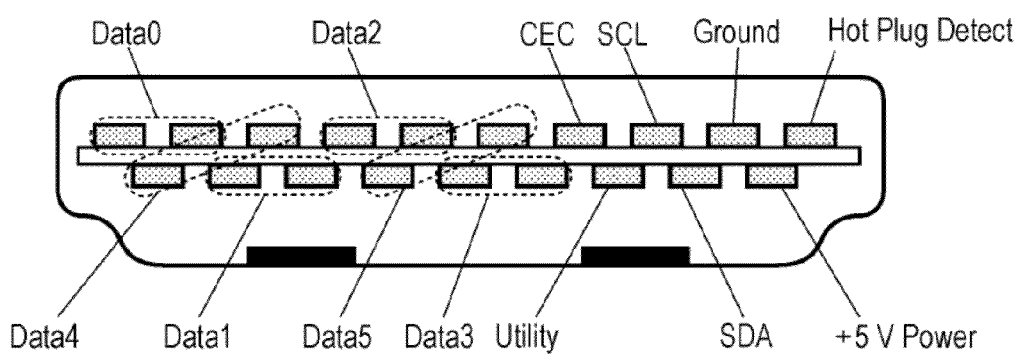

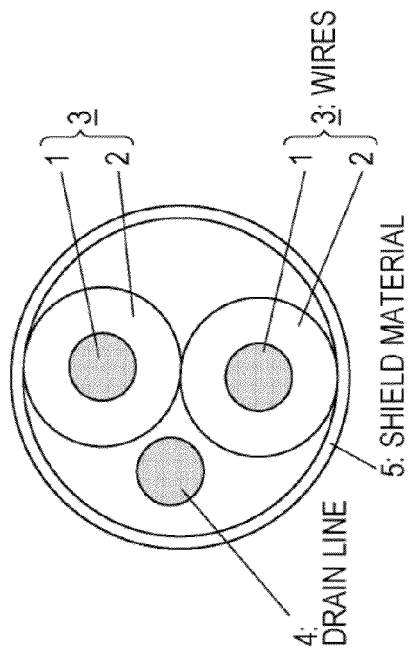
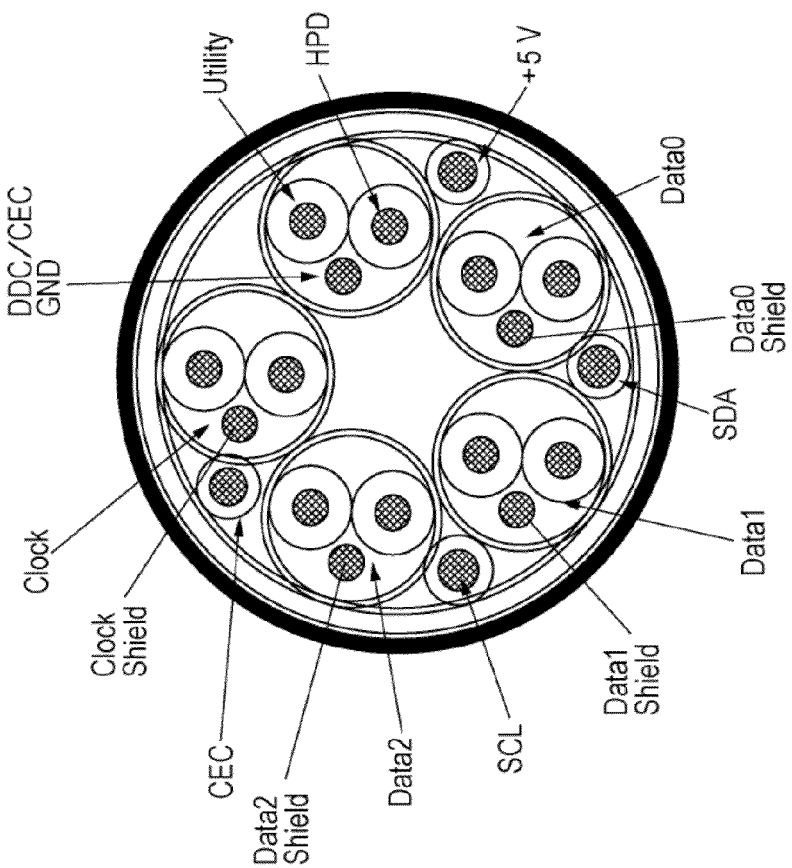

NEW HDMI CABLE CONFIGURATION EXAMPLE

NEW HDMI CABLE CONFIGURATION EXAMPLE

FIG. 12

(a) [display unit showing "CONNECTED WITH NEW HDMI"]

(b) [display unit showing "CONNECT WITH NEW HDMI" and "CONNECT WITH CONVENTIONAL HDMI"]

(c) [display unit showing "CONNECTION CABLE IS CONVENTIONAL HDMI CABLE. SOME NEW HDMI FUNCTIONS WILL BE RESTRICTED."]

FIG. 14

EDID EXAMPLE

| Byte # | 7 | 6 | 5 | 4 | 3 | 2 | 1 | 0 |
|---|---|---|---|---|---|---|---|---|
| | Rsvd (0) | Rsvd (0) | Rsvd (0) | Rsvd (0) | Rsvd (0) | New Rx Sink | New Cable | Rsvd (0) |

EXAMPLE OF NEW HDMI CABLE

EXAMPLE OF EDID DATA REWRITE CIRCUIT OF IN-CABLE LSI

EXAMPLE OF CABLE INFORMATION
NOTIFICATION CIRCUIT USING RF TAG CHIP

FIG. 29
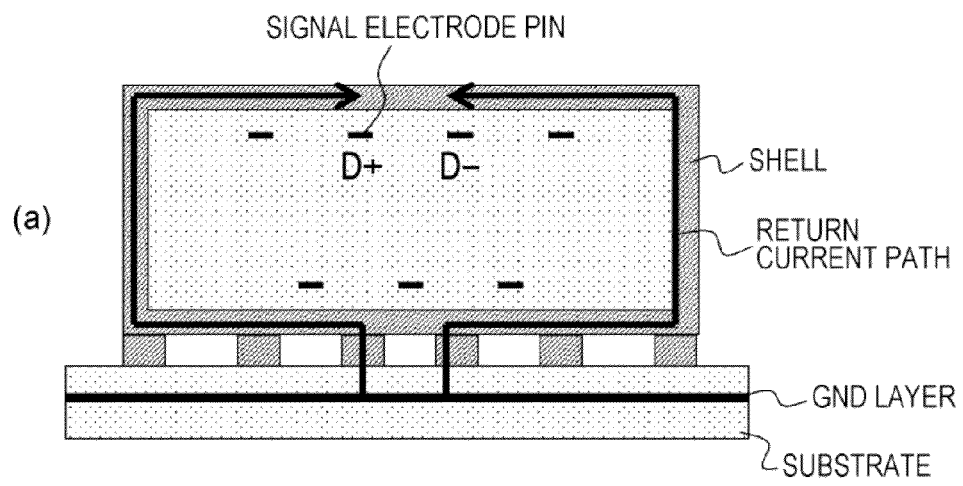
(a)
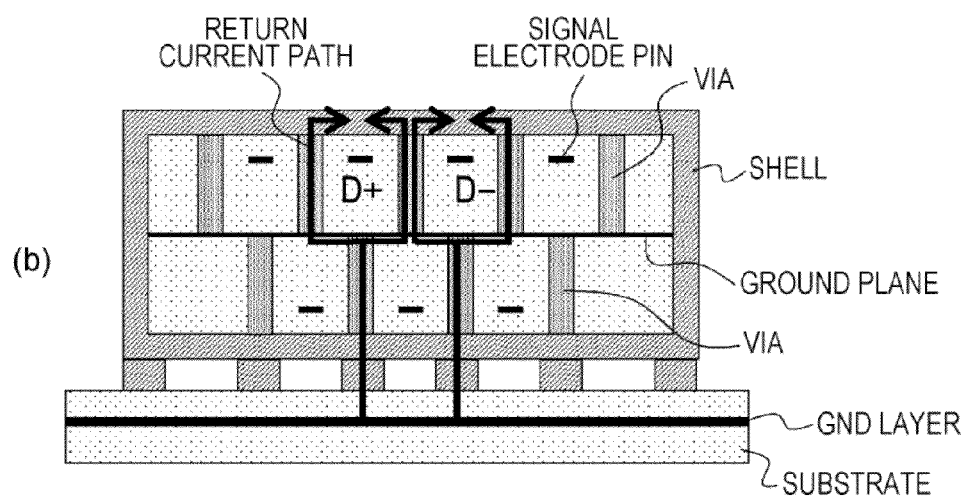
(b)

FIG. 35
(a) CONVENTIONAL HDMI PLUG
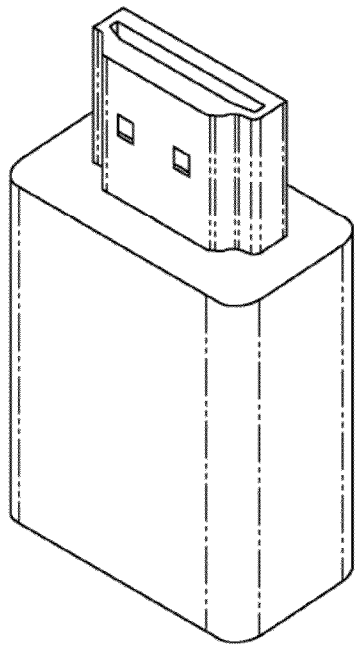
(b) NEW HDMI PLUG
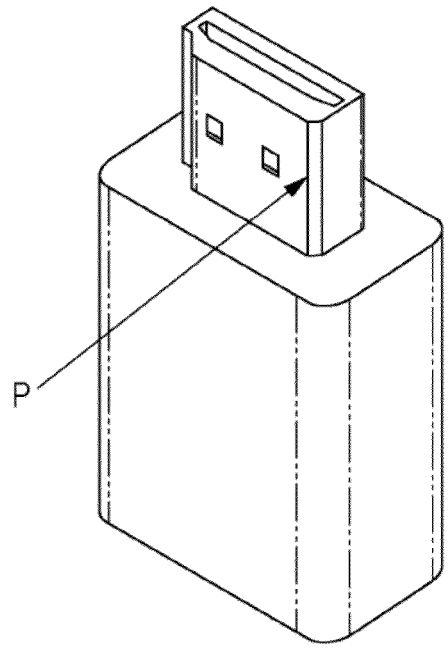

CONNECTOR, CABLE, TRANSMISSION DEVICE, RECEPTION DEVICE, AND MANUFACTURING METHOD OF CONNECTOR

CROSS-REFERENCE TO RELATED APPLICATION

The present application is a national phase entry under 35 U.S.C. §371 of International Application No. PCT/JP2011/077991 filed Dec. 2, 2011, published on Jun. 14, 2012 as WO 2012/077612 A1, which claims priority from Japanese Patent Application No. JP 2010-274240 filed in the Japanese Patent Office on Dec. 9, 2010.

TECHNICAL FIELD

This invention relates to a connector, a cable, a transmission device, a reception device, and a manufacturing method of the connector, and in particular relates to a connector used when transmitting digital signals such as video with differential signals of a predetermined number of channels.

BACKGROUND ART

In recent years, HDMI (High Definition Multimedia Interface) has come into widespread use as a digital interface connecting CE (Consumer Electronics) devices, and is a de facto industry standard. For example, NPL 1 describes the HDMI standard. With this HDMI standard, the signals of video, audio, and control, are transmitted using 3 data differential line pairs (TMDS Channel 0/1/2).

CITATION LIST

Non Patent Literature

NPL 1: High Definition Multimedia Interface Specification Version 1.4, Jun. 5, 2009

SUMMARY OF INVENTION

Technical Problem

Currently, a value stipulated by the HDMI standard as transmission speed of these digital signals is around 10.2 Gbps maximum. Taking into consideration compatibility with high image quality 3D (3 dimension) video signals, upcoming 4k2k (QFHD), and even higher image quality content video signals, the HDMI standard will hereafter be under demand to expand to the highest values of current standards and beyond, such as 15 Gbps, 20 Gbps, and so on.

Now, by newly assigning a data pairs to the shield used with the current differential line pair inside an HDMI connector, so as to increase the number of pairs of data lanes, the transmission band can be expanded while maintaining compatibility with the existing HDMI.

However, if the structure of the current HDMI connector is kept the same, the state of coupling of differential pairs by the shield deteriorates, and not only can the image quality of transmission at the newly-assigned data lanes not be maintained, but crosstalk to nearby lanes also occurs, so conventional signal quality cannot be maintained.

It is an object of the present invention to provide a connector and the like enabling high quality signal transmission while maintaining compatibility with the current HDMI connector, in a new HDMI interface using pins assigned to the shield provided to each data pair used with the current HDMI, as a data pair, besides the 3 data pairs used with the current HDMI.

Solution to Problem

A concept of this invention is a connector,
configured of a plurality of signal electrode pins which are disposed within a cuboid-shaped dielectric and which correspond to differential signals of a predetermined number of channels and extend in a first direction which is a predetermined axial direction of the cuboid, with the perimeter of the dielectric being covered by a square-tube grounding conductor opened in the first direction;
wherein each of the signal electrode pins is arrayed near the grounding conductor so as to couple with the grounding conductor, and differential signals are transmitted with single end.

With this invention, each of the signal electrode pins is arrayed near the grounding conductor so as to couple with the grounding conductor, and differential signals are transmitted with single end. That is to say, in order to cause coupling such that the electromagnetic field of signals being propagated is distributed between each of the signal electrode pins and the grounding conductor, each of the signal electrode pins is arrayed near the grounding conductor and differential signals are transmitted with single end. Accordingly, even in a state where coupling is not achieved with the pair of signal electrode pins transmitting differential signals, or in a state where there is no corresponding shielding signal electrode pin, crosstalk from other signal electrode pins can be reduced, and high quality signals can be transmitted.

Note that with this invention, for example, an arrangement may be made where the plurality of signal electrode pins corresponding to the differential signals of the predetermined number of channels are arrayed being divided into a first stage and a second stage, in a second direction orthogonal to the first direction; with the plurality of signal electrode pins of each stage being arrayed with a predetermined interval in a third direction orthogonal to the first direction and second direction; and a ground plane being disposed between the plurality of signal electrode pins of the first stage and the plurality of signal electrode pins of the second stage within the dielectric, and connecting conductors electrically connecting the ground plane and the grounding conductor are disposed between each of the signal electrode pins of each of the stages within the dielectric.

In this case, the ground plane is disposed between the first stage of a plurality of signal electrode pins and the second stage of a plurality of signal electrode pins within the dielectric, so crosstalk between the first stage of signal electrode pins and the second stage of signal electrode pins is reduced. Also, connection conductors for electrically connecting the ground plane and the grounding conductor, vias (via) for example are disposed between the signal electrode pins of each stage, so crosstalk is reduced between the signal electrode pins of each stage. Accordingly, with the pair of signal electrode pins transmitting differential signals, crosstalk from other signal electrode pins can be further reduced, and higher quality signals can be transmitted.

Also, another concept of this invention is a connector,
configured of a plurality of signal electrode pins which are disposed within a cuboid-shaped dielectric and which correspond to differential signals of a predetermined number of channels and extend in a first direction which is a predetermined axial direction of the cuboid, with the perimeter of the dielectric being covered by a square-tube grounding conductor opened in the first direction;

wherein the plurality of signal electrode pins corresponding to the differential signals of the predetermined number of channels are arrayed being divided into a first stage and a second stage, in a second direction orthogonal to the first direction;

and wherein the plurality of signal electrode pins of each stage are arrayed with a predetermined interval in a third direction orthogonal to the first direction and second direction;

and wherein a ground plane is disposed between the plurality of signal electrode pins of the first stage and the plurality of signal electrode pins of the second stage within the dielectric, and connecting conductors electrically connecting the ground plane and the grounding conductor are disposed between each of the signal electrode pins of each of the stages within the dielectric.

In this case, the ground plane is disposed between the first stage of a plurality of signal electrode pins and the second stage of a plurality of signal electrode pins within the dielectric, so crosstalk between the first stage of signal electrode pins and the second stage of signal electrode pins is reduced. Also, connection conductors for electrically connecting the ground plane and the grounding conductor, vias for example are disposed between the signal electrode pins of each stage, so crosstalk is reduced between the signal electrode pins of each stage. Accordingly, with the pair of signal electrode pins transmitting differential signals, crosstalk from other signal electrode pins can be further reduced, and higher quality signals can be transmitted.

Also, another concept of this invention is
a cable, which transmits digital signals by differential signals of a predetermined number of channels from a transmission device to a reception device, comprising a plug on an end;

wherein the plug is configured of a plurality of signal electrode pins which are disposed within a cuboid-shaped dielectric and which correspond to differential signals of a predetermined number of channels and extend in a first direction which is a predetermined axial direction of the cuboid, with the perimeter of the dielectric being covered by a square-tube grounding conductor opened in the first direction; and wherein each of the signal electrode pins is arrayed near the grounding conductor so as to couple with the grounding conductor, and differential signals are transmitted with single end.

With this invention, each of the signal electrode pins is coupled with the grounding conductor, and differential signals are transmitted with single end. That is to say, in order to cause coupling such that the electromagnetic field of signals being propagated is distributed between each of the signal electrode pins and the grounding conductor, each of the signal electrode pins is arrayed near the grounding conductor and differential signals are transmitted with single end. Accordingly, even in a state where coupling is not achieved with the pair of signal electrode pins transmitting differential signals, or in a state where there is no corresponding shielding signal electrode pin, crosstalk from other signal electrode pins can be reduced, and high quality signals can be transmitted.

Note that with this invention, for example, an arrangement may be made where the plurality of signal electrode pins corresponding to the differential signals of the predetermined number of channels are arrayed being divided into a first stage and a second stage, in a second direction orthogonal to the first direction; the plurality of signal electrode pins of each stage being arrayed with a predetermined interval in a third direction orthogonal to the first direction and second direction; and a ground plane being disposed between the plurality of signal electrode pins of the first stage and the plurality of signal electrode pins of the second stage within the dielectric, and connecting conductors electrically connecting the ground plane and the grounding conductor are disposed between each of the signal electrode pins of each of the stages within the dielectric.

In this case, the ground plane is disposed between the first stage of a plurality of signal electrode pins and the second stage of a plurality of signal electrode pins within the dielectric, so crosstalk between the first stage of signal electrode pins and the second stage of signal electrode pins is reduced. Also, connection conductors for electrically connecting the ground plane and the grounding conductor, vias for example are disposed between the signal electrode pins of each stage, so crosstalk is reduced between the signal electrode pins of each stage. Accordingly, with the pair of signal electrode pins transmitting differential signals, crosstalk from other signal electrode pins can be further reduced, and higher quality signals can be transmitted.

Also, another concept of this invention is a cable, which transmits digital signals by differential signals of a predetermined number of channels from a transmission device to a reception device, comprising a plug on an end;

wherein the plug is configured of a plurality of signal electrode pins which are disposed within a cuboid-shaped dielectric and which correspond to differential signals of a predetermined number of channels and extend in a first direction which is a predetermined axial direction of the cuboid, with the perimeter of the dielectric being covered by a square-tube grounding conductor opened in the first direction;

and wherein the plurality of signal electrode pins corresponding to the differential signals of the predetermined number of channels are arrayed being divided into a first stage and a second stage, in a second direction orthogonal to the first direction;

and wherein the plurality of signal electrode pins of each stage are arrayed with a predetermined interval in a third direction orthogonal to the first direction and second direction;

and wherein a ground plane is disposed between the plurality of signal electrode pins of the first stage and the plurality of signal electrode pins of the second stage within the dielectric, and connecting conductors electrically connecting the ground plane and the grounding conductor are disposed between each of the signal electrode pins of each of the stages within the dielectric.

With this invention, the ground plane is disposed between the first stage of a plurality of signal electrode pins and the second stage of a plurality of signal electrode pins within the dielectric, so crosstalk between the first stage of signal electrode pins and the second stage of signal electrode pins is reduced. Also, connection conductors for electrically connecting the ground plane and the grounding conductor, vias for example are disposed between the signal electrode pins of each stage, so crosstalk is reduced between the signal electrode pins of each stage. Accordingly, with the pair of signal electrode pins transmitting differential signals, crosstalk from other signal electrode pins can be further reduced, and higher quality signals can be transmitted.

Also, another concept of this invention is a transmission device, including:

a digital signal transmission unit which transmits digital signals to an external device by differential signals via a cable, having a first operation mode of which the number of channels of the differential signals is a first number, and a second operation mode of which the number of channels of the differential signals is a second number greater than the first number;

an operation mode determining unit which determines whether or not the external device and the cable are compatible with the second operation mode;

an operation control unit which controls operation of the digital signal transmission unit based on determination by the operation mode determining unit; and a receptacle having a plurality of signal electrode pins for connecting a plug of the cable;

wherein the digital signal transmission unit selects a first pin assignment in the first operation mode, and in the second operation mode selects a second pin assignment which differs from the first pin assignment, in which a terminal used as a shield terminal corresponding to a signal terminal of digital signal and/or clock signal differential signals in the first pin assignment, is used as a signal terminal for differential signals to transmit digital signals;

and wherein the receptacle is configured of the plurality of signal electrode pins which are disposed within a cuboid-shaped dielectric and extend in a first direction which is a predetermined axial direction of the cuboid, with the perimeter of the dielectric being covered by a square-tube grounding conductor opened in the first direction;

and wherein each of the signal electrode pins is arrayed near the grounding conductor so as to couple with the grounding conductor, and differential signals are transmitted with single end.

With this invention, each of the signal electrode pins is coupled with the grounding conductor, and differential signals are transmitted with single end. That is to say, in order to cause coupling such that the electromagnetic field of signals being propagated is distributed between each of the signal electrode pins and the grounding conductor, each of the signal electrode pins is arrayed near the grounding conductor and differential signals are transmitted with single end. Accordingly, even in a state where coupling is not achieved with the pair of signal electrode pins transmitting differential signals, or in a state where there is no corresponding shielding signal electrode pin, crosstalk from other signal electrode pins can be reduced, and high quality signals can be transmitted (transmitted).

Note that with this invention, for example, an arrangement may be made where the plurality of signal electrode pins are arrayed being divided into a first stage and a second stage, in a second direction orthogonal to the first direction; with the plurality of signal electrode pins of each stage being arrayed with a predetermined interval in a third direction orthogonal to the first direction and second direction; and with a ground plane being disposed between the plurality of signal electrode pins of the first stage and the plurality of signal electrode pins of the second stage within the dielectric, and connecting conductors electrically connecting the ground plane and the grounding conductor being disposed between each of the signal electrode pins of each of the stages.

In this case, the ground plane is disposed between the first stage of a plurality of signal electrode pins and the second stage of a plurality of signal electrode pins within the dielectric, so crosstalk between the first stage of signal electrode pins and the second stage of signal electrode pins is reduced. Also, connection conductors for electrically connecting the ground plane and the grounding conductor, vias for example are disposed between the signal electrode pins of each stage, so crosstalk is reduced between the signal electrode pins of each stage. Accordingly, with the pair of signal electrode pins transmitting differential signals, crosstalk from other signal electrode pins can be further reduced, and higher quality signals can be transmitted (transmitted).

Also, another concept of this invention is a transmission device, including:

a digital signal transmission unit which transmits digital signals to an external device by differential signals via a cable, having a first operation mode of which the number of channels of the differential signals is a first number, and a second operation mode of which the number of channels of the differential signals is a second number greater than the first number;

an operation mode determining unit which determines whether or not the external device and the cable are compatible with the second operation mode;

an operation control unit which controls operation of the digital signal transmission unit based on determination by the operation mode determining unit; and a receptacle having a plurality of signal electrode pins for connecting a plug of the cable;

wherein the digital signal transmission unit selects a first pin assignment in the first operation mode, and in the second operation mode selects a second pin assignment which differs from the first pin assignment, in which a terminal used as a shield terminal corresponding to a signal terminal of digital signal and/or clock signal differential signals in the first pin assignment, is used as a signal terminal for differential signals to transmit digital signals;

and wherein the receptacle is configured of the plurality of signal electrode pins which are disposed within a cuboid-shaped dielectric and extend in a first direction which is a predetermined axial direction of the cuboid, with the perimeter of the dielectric being covered by a square-tube grounding conductor opened in the first direction;

and wherein the plurality of signal electrode pins are arrayed being divided into a first stage and a second stage, in a second direction orthogonal to the first direction;

and wherein the plurality of signal electrode pins of each stage are arrayed with a predetermined interval in a third direction orthogonal to the first direction and second direction;

and wherein a ground plane is disposed between the plurality of signal electrode pins of the first stage and the plurality of signal electrode pins of the second stage within the dielectric, and connecting conductors electrically connecting the ground plane and the grounding conductor are disposed between each of the signal electrode pins of each of the stages within the dielectric.

With this invention, the ground plane is disposed between the first stage of a plurality of signal electrode pins and the second stage of a plurality of signal electrode pins within the dielectric, so crosstalk between the first stage of signal electrode pins and the second stage of signal electrode pins is reduced. Also, connection conductors for electrically connecting the ground plane and the grounding conductor, are disposed between the signal electrode pins of each stage, so crosstalk is reduced between the signal electrode pins of each stage. Accordingly, with the pair of signal electrode pins transmitting differential signals, crosstalk from other signal electrode pins can be further reduced, and high quality signals can be transmitted (transmitted).

Also, another concept of this invention is a reception device, including:

a digital signal reception unit which receives digital signals from an external device by differential signals via a cable, having a first operation mode of which the number of channels of the differential signals is a first number, and a second operation mode of which the number of channels of the differential signals is a second number greater than the first number;

an information reception unit which receives operation mode information from the external device regarding which of the first operation mode and the second operation mode to select;

an operation control unit which controls operation of the digital signal transmission unit based the operation mode information received by the information reception unit; and a receptacle having a plurality of signal electrode pins for connecting a plug of the cable;

wherein the information reception unit selects a first pin assignment in the first operation mode, and in the second operation mode selects a second pin assignment which differs from the first pin assignment, in which a terminal used as a shield terminal corresponding to a signal terminal of digital signal and/or clock signal differential signals in the first pin assignment, is used as a signal terminal for differential signals to transmit digital signals;

and wherein the receptacle is configured of the plurality of signal electrode pins which are disposed within a cuboid-shaped dielectric and extend in a first direction which is a predetermined axial direction of the cuboid, with the perimeter of the dielectric being covered by a square-tube grounding conductor opened in the first direction;

and wherein each of the signal electrode pins is arrayed near the grounding conductor so as to couple with the grounding conductor, and differential signals are transmitted with single end.

With this invention, each of the signal electrode pins is coupled with the grounding conductor, and differential signals are transmitted with single end. That is to say, in order to cause coupling such that the electromagnetic field of signals being propagated is distributed between each of the signal electrode pins and the grounding conductor, each of the signal electrode pins is arrayed near the grounding conductor and differential signals are transmitted with single end. Accordingly, even in a state where coupling is not achieved with the pair of signal electrode pins transmitting differential signals, or in a state where there is no corresponding shielding signal electrode pin, crosstalk from other signal electrode pins can be reduced, and high quality signals can be transmitted (received).

Note that with this invention, an arrangement may be made wherein, for example, the plurality of signal electrode pins are arrayed being divided into a first stage and a second stage, in a second direction orthogonal to the first direction; with the plurality of signal electrode pins of each stage being arrayed with a predetermined interval in a third direction orthogonal to the first direction and second direction; and with a ground plane being disposed between the plurality of signal electrode pins of the first stage and the plurality of signal electrode pins of the second stage within the dielectric, and connecting conductors electrically connecting the ground plane and the grounding conductor are disposed between each of the signal electrode pins of each of the stages.

In this case, the ground plane is disposed between the first stage of a plurality of signal electrode pins and the second stage of a plurality of signal electrode pins within the dielectric, so crosstalk between the first stage of signal electrode pins and the second stage of signal electrode pins is reduced. Also, connection conductors for electrically connecting the ground plane and the grounding conductor, vias for example are disposed between the signal electrode pins of each stage, so crosstalk is reduced between the signal electrode pins of each stage. Accordingly, with the pair of signal electrode pins transmitting differential signals, crosstalk from other signal electrode pins can be further reduced, and higher quality signals can be transmitted (received).

Another concept of this invention is a reception device, including:

a digital signal reception unit which receives digital signals from an external device by differential signals via a cable, having a first operation mode of which the number of channels of the differential signals is a first number, and a second operation mode of which the number of channels of the differential signals is a second number greater than the first number;

an information reception unit which receives operation mode information from the external device regarding which of the first operation mode and the second operation mode to select;

an operation control unit which controls operation of the digital signal transmission unit based the operation mode information received by the information reception unit; and a receptacle having a plurality of signal electrode pins for connecting a plug of the cable;

wherein the information reception unit selects a first pin assignment in the first operation mode, and in the second operation mode selects a second pin assignment which differs from the first pin assignment, in which a terminal used as a shield terminal corresponding to a signal terminal of digital signal and/or clock signal differential signals in the first pin assignment, is used as a signal terminal for differential signals to transmit digital signals;

and wherein the receptacle is configured of the plurality of signal electrode pins which are disposed within a cuboid-shaped dielectric and extend in a first direction which is a predetermined axial direction of the cuboid, with the perimeter of the dielectric being covered by a square-tube grounding conductor opened in the first direction;

and wherein the plurality of signal electrode pins are arrayed being divided into a first stage and a second stage, in a second direction orthogonal to the first direction;

and wherein the plurality of signal electrode pins of each stage are arrayed with a predetermined interval in a third direction orthogonal to the first direction and second direction;

and wherein a ground plane is disposed between the plurality of signal electrode pins of the first stage and the plurality of signal electrode pins of the second stage within the dielectric, and connecting conductors electrically connecting the ground plane and the grounding conductor are disposed between each of the signal electrode pins of each of the stages.

In this case, the ground plane is disposed between the first stage of a plurality of signal electrode pins and the second stage of a plurality of signal electrode pins within the dielectric, so crosstalk between the first stage of signal electrode pins and the second stage of signal electrode pins is reduced. Also, connection conductors for electrically connecting the ground plane and the grounding conductor, vias for example are disposed between the signal electrode pins of each stage, so crosstalk is reduced between the signal electrode pins of each stage. Accordingly, with the pair of signal electrode pins transmitting differential signals, crosstalk from other signal electrode pins can be further reduced, and higher quality signals can be transmitted (received).

Another concept of this invention is a manufacturing method of a connector, configured of a plurality of signal electrode pins which are disposed within a cuboid-shaped dielectric and which correspond to differential signals of a predetermined number of channels and extend in a first direction which is a predetermined axial direction of the cuboid, with the perimeter of the dielectric being covered by a square-tube grounding conductor opened in the first direction, each of the signal electrode pins being arrayed near the grounding conductor so as to couple with the grounding conductor, and differential signals being transmitted with single end, the plurality of signal electrode pins being arrayed divided into a first stage and a second stage, in a second direction orthogonal to the first direction, the plurality of signal electrode pins of each stage being arrayed with a predetermined interval in a third direction orthogonal to the first direction and second direction, and a ground plane being disposed between the plurality of signal electrode pins of the first stage and the plurality of signal electrode pins of the second stage within the dielectric, and connecting conductors electrically connecting the ground plane and the grounding conductor being disposed between each of the signal electrode pins of each of the stages within the dielectric;

wherein the inside of the grounding conductor is manufactured by combining a plurality of parts.

With this invention, the inside of the grounding conductor is manufactured by combining a plurality of parts. For example, the plurality of parts is a multi-layer substrate having the ground plane, a conductor (GND conductor) making up the grounding conductor, for connecting the ground plane of the multi-layer substrate to the grounding conductor, the signal electrode pins, and a dielectric having holes into which the signal electrode pins and the conductor (GND conductor) are inserted, disposed between the multi-layer substrate and the grounding conductor.

Advantageous Effects of Invention

According to this invention, even in a state where coupling is not achieved with the pair of signal electrode pins transmitting differential signals, or in a state where there is no corresponding shielding signal electrode pin, crosstalk from other signal electrode pins can be reduced, and high quality signals can be transmitted.

BRIEF DESCRIPTION OF DRAWINGS

FIG. 6 is a diagram comparing and illustrating pin assignment of the current HDMI (Type A) and the new HDMI.

FIG. 7 is a diagram illustrating pin assignment of receptacles of a source device and sink device of the current HDMI and new HDMI.

FIG. 8 is a diagram illustrating a structure example of a current HDMI cable.

FIG. 12 is a diagram illustrating an example of a UI screen displayed on the display unit (display) under control of the control unit of the source device.

FIG. 14 is a diagram illustrating an example of flag information newly defined on EDID.

FIG. 29 is a diagram describing a return path of a shared phase component to the differential signals (D+ and D−) in the event of no via being formed and in the event of a via being formed.

FIG. 35 is a perspective view of the plug of the current HDMI cable and new HDMI cable.

DESCRIPTION OF EMBODIMENTS

Hereinafter, description will be made regarding an embodiment of the present disclosure (hereinafter, referred to as embodiment). Note that description will be made with the following order.
1. Embodiment
2. Modification
<1. Embodiment>
[Configuration Example of AV System]

Figure 1:
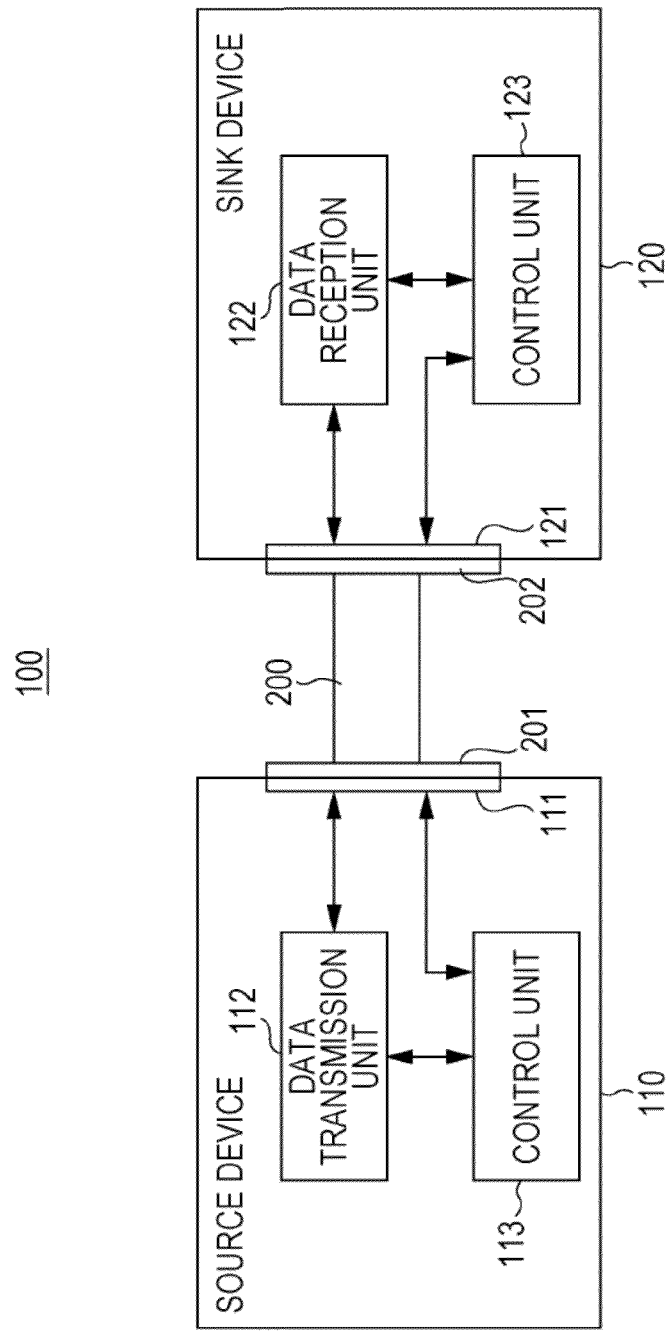
FIG. 1 is a block diagram illustrating a configuration example of an AV system as an embodiment of the present invention.

FIG. 1 illustrates a configuration example of an AV (Audio and Visual) system 100 as an embodiment. This AV system 100 is configured by connecting a source device 110 to a sink device 120. The source device 110 is an AV source such as a game machine, a disc player, a set top box, a digital camera, or a cellular phone, for example. The sink device 120 is a television receiver, a projector, or the like, for example.

The source device 110 and the sink device 120 are connected via the cable 200. A receptacle 111 to which the data transmission unit 112 is connected, making up a connector, is provided in the source device 110. A receptacle 121 to which the data reception unit 122 is connected, making up a connector, is provided in the sink device 120.

Also, a plug 201 making up a connector is provided at one end of the cable 200 and a plug 202 making up a connector is provided at the other end of the cable 200. The plug 201 has one end of the cable 200 connected to the receptacle 111 of the source device 110, and the plug 202 has the other end of this cable 200 connected to the receptacle 121 of the sink device 120.

The source device 110 has a control unit 113. This control unit 113 controls the overall source device 110. With this embodiment, the data transmission unit 112 of the source device 110 is compatible with both of the current HDMI and new HDMI. In the event that the determination is made that the cable 200 is compatible with the new HDMI and the sink device 120 is compatible with the new HDMI, the control unit 113 controls the data transmission unit 112 so as to operate in a new HDMI operation mode. On the other hand, in the event that the determination is made that the sink device 120 at least is compatible only with the current HDMI or the cable 200 is compatible with the current HDMI, the control unit 113 controls the data transmission unit 112 so as to operate in a current HDMI operation mode.

The sink device 120 has a control unit 123. This control unit 123 controls the overall sink device 120. With this embodiment, the data reception unit 122 of the sink device 120 is compatible with only with the current HDMI, or to both of the current HDMI and new HDMI. In the event that the data reception unit 122 is compatible with both of the current HDMI and new HDMI, the control unit 123 controls the data reception unit 122 so as to operate in the same operation mode as with the data transmission unit 112 of the source device 110. In this case, the control unit 123 controls the operation mode of the data reception unit 122, based on the determination result of the operation mode transmitted through a line such as CEC or the like, from the source device 110. The cable 200 is compatible with the current HDMI or new HDMI.

Figure 2:
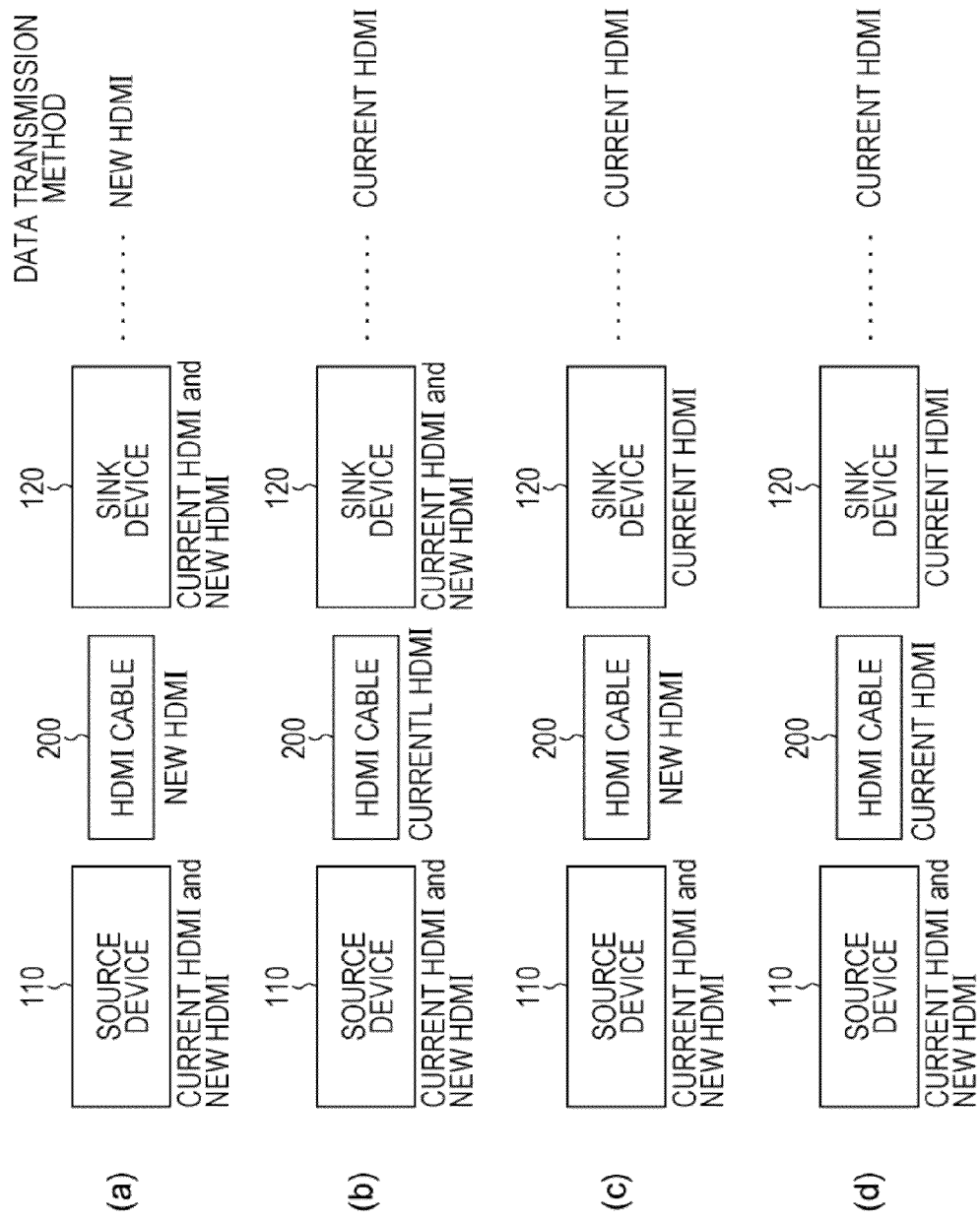
FIG. 2 is a diagram illustrating a combination example of a source device, an HDMI cable, and a sink device.

In the AV system 100 illustrated in FIG. 1, as illustrated in FIG. 2(a), when the cable 200 is compatible with the new HDMI and the sink device 120 is compatible with both of the current HDMI and new HDMI, data transmission is performed with the new HDMI. At this time, the data transmission unit 112 of the source device 110 and the data reception unit 122 of the sink device 120 are controlled so as to operate in the new HDMI operation mode.

Also, in the AV system illustrated in FIG. 1, as illustrated in FIGS. 2(b) through (d), when the cable 200 at least is compatible with the current HDMI, or the sink device 120 is compatible with to the current HDMI, data transmission with the current HDMI is performed. In this case, the data transmission unit 112 of the source device 110 is controlled so as to operate in the current HDMI operation mode. Also, the data reception unit 122 of the sink device 120 is compatible with both of the current HDMI and new HDMI is controlled so as to operate in the current HDMI operation mode. Note that, in the case of FIG. 2(b), there are some cases where data transmission in the new HDMI mode may be performed when data transmission of the new HDMI can be performed through the cable 200 by decreasing the data transfer rate.

[Configuration Examples of Data Transmission Unit and Data Reception Unit]

Figure 3:
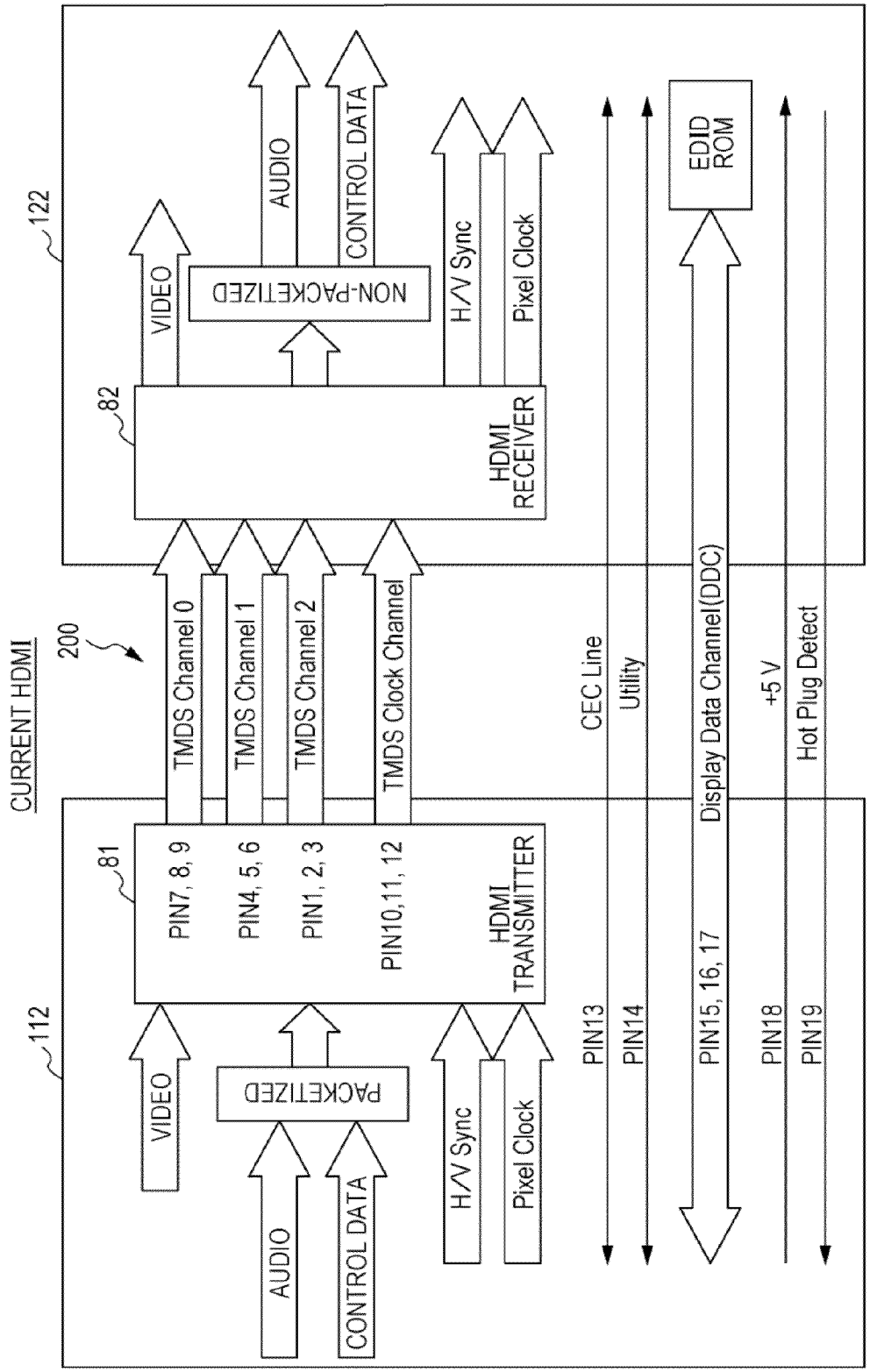
FIG. 3 is a diagram illustrating a configuration example of a data transmission unit of the source device and a data reception unit of the sink device (under current HDMI operation mode).
Figure 4:
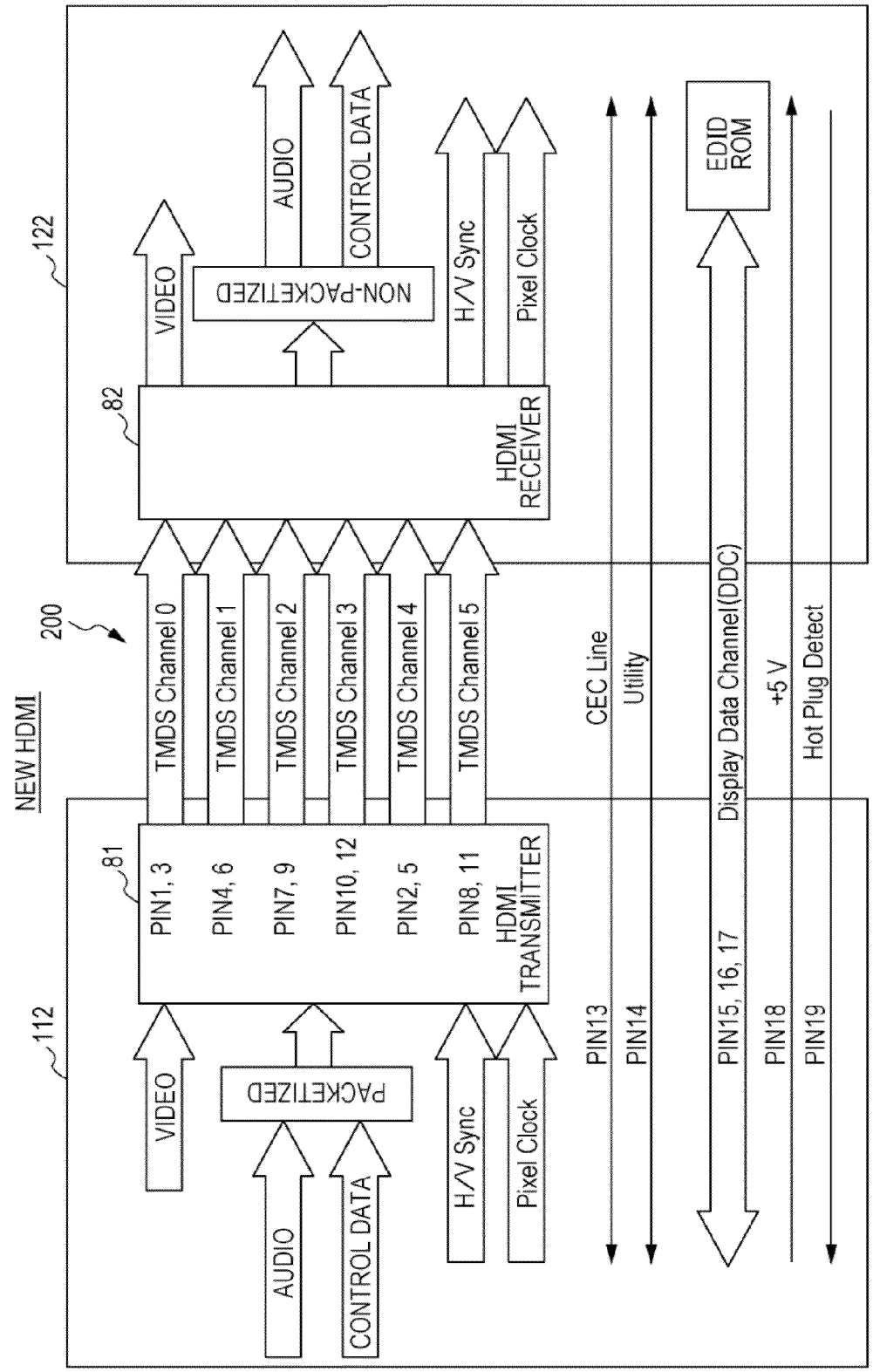
FIG. 4 is a diagram illustrating a configuration example of a data transmission unit of the source device and a data reception unit of the sink device (under new HDMI operation mode).

FIG. 3 and FIG. 4 illustrate configuration examples of the data transmission unit 112 of the source device 110 and the data reception unit 122 of the sink device 120 in the AV system 100 in FIG. 1. The data transmission unit 112 transmits, in a valid image section (also referred to as "active video section") a differential signal corresponding to one uncompressed screen worth of video data to the data reception unit 122 in one direction with multiple channels.

Here, the valid image section is a section from one vertical synchronizing signal to the next vertical synchronizing signal, excluding the horizontal blanking interval and vertical blanking interval. Also, the data transmission unit 112 transmits, in one direction with multiple channels in the horizontal blanking interval or vertical blanking interval, a differential signal corresponding to audio data and control data at least associated with video data, and other auxiliary data, to the data reception unit 122.

The data reception unit 122 receives, in the active video section, differential signals corresponding to the video data which is transmitted from the data transmission unit 122 in one direction with multiple channels. Also, this data reception unit 122 receives, in a horizontal blanking interval or a vertical blanking interval, differential signals corresponding to the audio data and control data which are transmitted from the data transmission unit 122 in one direction with multiple channels.

Transmission channels in the HDMI system made up of the data transmission unit 112 and the data reception unit 122 include the following. First of all, transmission channels include differential signal channels (TMDS channel and TMDS clock channel). The differential signal channels to transmit digital signals such as video data is three channels in the current HDMI, but six channels in the new HDMI.

Description will be made regarding the differential signal channel in the current HDMI. As illustrated in FIG. 3, there are three TMDS channels #0 through #2 as transmission channels to synchronize the video data and audio data to the pixel clock and perform serial transmission in one direction from the data transmission unit 112 to the data reception unit 122. Also, there is a TMDS clock channel as a transmission channel to transmit TMDS clock.

An HDMI transmitter 81 of the data transmission unit 112 converts uncompressed video data into the corresponding differential signals, and performs serial transmission in one direction to the data reception unit 122 connected via the cable 200, with the three TMDS channels #0, #1, and #2, for example. Also, the HDMI transmitter 81 converts audio data associated with the uncompressed video data, necessary control data, and other auxiliary data, into the corresponding differential signals and performs serial transmission in one direction to the data reception unit 122 with the three TMDS channels #0, #1, and #2.

Further, the HDMI transmitter 81 transmits the TMDS clock synchronized with the video data to be transmitted with the three TMDS channels #0, #1, and #2, to the data transmission unit 122 with the TMDS clock channel. Here, with a TMDS channel #i (i=0, 1, 2), 10-bit video data is transmitted during one clock of the TMDS clock.

An HDMI receiver 82 of the data reception unit 122 receives differential signals corresponding to the video data and differential signals corresponding to the audio data and control data transmitted from the data transmission unit 112 in one direction, with the TMDS channels #0, #1, and #2. In this case, the differential signals are synchronized with the pixel clock (TMDS clock) transmitted from the data transmission unit 112 with the TMDS clock channel, and received.

Next, description will be made regarding the differential signal channels in the new HDMI. As illustrated in FIG. 4, there are six TMDS channels #0 through #5 as transmission channels to synchronize the video data and audio data to the pixel clock and perform serial transmission in one direction from the data transmission unit 112 to the data reception unit 122. Note that, with this new HDMI, transmission of the TMDS clock is omitted, and a self-clock method to reproduce a clock from the received data on the reception side, is employed.

An HDMI transmitter 81 of the data transmission unit 112 converts uncompressed video data into the corresponding differential signals, for example and performs serial transmission in one direction to the data reception unit 122 connected via the cable 200, with the six TMDS channels #0 through #5. Also, this HDMI transmitter 81 converts audio data associated with the uncompressed video data, necessary control data, and other auxiliary data into the corresponding differential signals and performs serial transmission in one direction to the data reception unit 122 with the six TMDS channels #0 through #5.

An HDMI receiver 82 of the data reception unit 122 receives differential signals corresponding to the video data and differential signals corresponding to the audio data and control data transmitted from the data transmission unit 112 in one direction, with the TMDS channels #0 through #5. In this case, the HDMI receiver 82 reproduces a pixel clock from the received data, and performs reception while synchronizing with the pixel clock (TMDS clock).

Examples of the transmission channels of the HDMI system include transmission channels called a DDC (Display Data Channel) and a CEC line, besides the above-described the TMDS channel and TMDS clock channel. The DDC is made up of unshown two signal lines included in the cable 200. The DDC is used for the data transmission unit 112 to read E-EDID (Enhanced Extended Display Identification Data) from the data reception unit 122.

That is to say, the data reception unit 122 has EDIDROM (EEPROM) storing E-EDID which is capability information regarding its own capability (Configuration/capability), besides the HDMI receiver 82. The data transmission unit 112 reads the E-EDID through the DDC from the connected data reception unit 122 via the cable 200, in accordance with a request from the control unit 113, for example.

The data transmission unit 112 transmits the read E-EDID to the control unit 113. The control unit 113 stores this E-EDID in unshown flash ROM or DRAM. The control unit 113 can recognize setting of capabilities of the data reception unit 122, based on the E-EDID. For example, the control unit 113 recognizes whether or not the sink device 120 having the data reception unit 122 is compatible with the new HDMI, besides the current HDMI. The CEC line is made up of an unshown signal line included in the cable 200 and is used to perform bidirectional communication of data for control between the data transmission unit 112 and data reception unit 122.

Also, a line (HPD line) connected to a pin called HPD (Hot Plug Detect) is included in the cable 200. A source device can detect connecting of a sink device using this HPD line. Note that, this HPD line is also used as an HEAC-line making up bidirectional communication. Also, a power line (+5V power Line) to be used for supplying power from the source device to the sink device is included in the cable 200. Further, a utility line is included in the cable 200. This utility line is used as an HEAC+line making up a bidirectional communication path.

Figure 5:
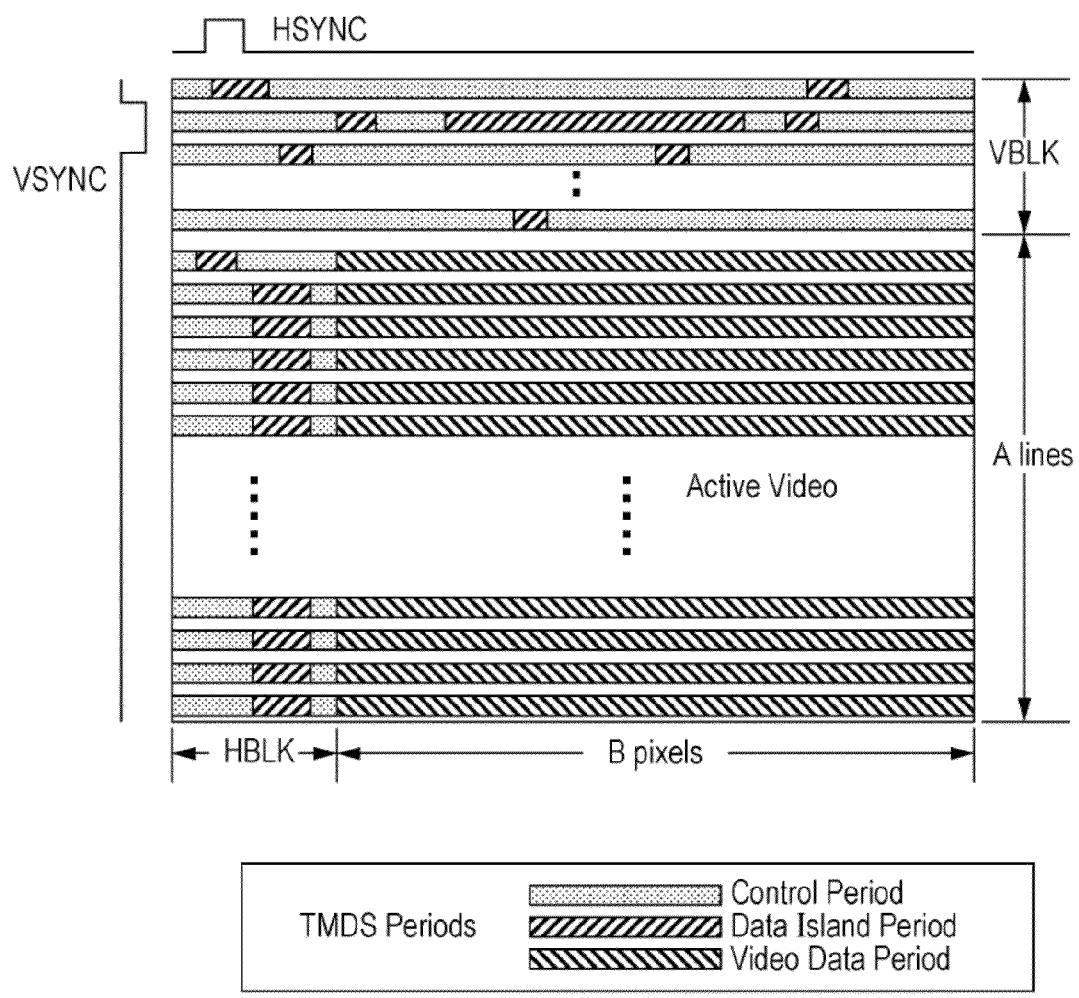
FIG. 5 is a diagram illustrating a structure example of TMDS transmission data.

FIG. 5 illustrates structure examples of the TMDS transmission data. This FIG. 5 indicates periods of various transmission data in the event that the image data where width× height is B pixels×A lines is transmitted, by the TMDS channels #0 through #2 or the TMDS channels #0 through #5. There are three types of periods in accordance with the types of the transmission data in Video Field where transmission data is transmitted with the TMDS channels of the HDMI. These three types of periods are a video data period (Video Data period), a data island period (Data Islandperiod), and a control period (Control period).

Here, a video field period is a period from the leading edge of a vertical synchronizing signal (active edge) to the leading edge of the next vertical synchronizing signal. This video field period is divided into a horizontal blanking period (horizontal blanking), a vertical blanking period (verticalblanking), and an active video period (Active Video). This active video period is, from the video field period, the video data period which is a period where the horizontal blanking period and vertical blanking period has been removed, allocated to the active video period. With this video data period, data of B pixels (pixels)×A lines worth of valid pixels (active pixels) making up the one uncompressed screen worth of the image data, is transmitted.

The data island period and control period are allocated to the horizontal blanking period and vertical blanking period. With these data island period and control period, auxiliary data (Auxiliary data) is transmitted. That is to say, the data island period is allocated to one portion of the horizontal blanking period and the vertical blanking period. With this data island period, of the auxiliary data, for example, packets of audio data which do not relate to control are transmitted. The control period are allocated to the other portions of the horizontal blanking period and the vertical blanking period. With this control period, of the auxiliary data, for example, the vertical synchronizing signal, the horizontal synchronizing signal, and control packets which relate to control, are transmitted.

Here, description will be made regarding pin assignment of the receptacle 111. First, pin assignment of the current HDMI (type A) will be described. This pin assignment of the current HDMI makes up the first pin assignment. FIG. 6(a) indicates pin assignment of this current HDMI. TMDS Data #i+ and TMDS Data #i− which are differential signals of the TMDS channel #i (i=0 through 2) are transmitted by two lines which are differential lines. Pins (the pins of which pin numbers are 7, 4, and 1) are assigned to the TMDS Data #i+ and pins (the pins of which pin numbers are 9, 6, and 3) are assigned to the TMDS Data #i−. Note that the pins of which pin numbers are 8, 5, and 2 are assigned to TMDS Data #i Shield (i=0 through 2).

TMDS Clock+ and TMDS Clock− which are differential signals of the TMDS Clock channel are transmitted by two lines which are differential lines. The pin of which pin number is 10 is assigned to the TMDS Clock+ and the pin of which pin number is 12 is assigned to the TMDS Clock−. Note that the pin of which pin number is 11 is assigned to TMDS Clock Shield.

Also, a CEC signal to be data for control is transmitted with the CEC line. The pin of which pin number is 13 is assigned to the CEC signal. Also, an SDA (Serial Data) signal such as E-EDID is transmitted with the SDA line. The pin of which pin number is 16 is assigned to the SDA signal. Also, an SCL (Serial Clock) signal which a clock signal to be used for synchronization at the time of transmission and reception of the SDA signal is transmitted with the SCL line. The pin of which pin number is 15 is assigned to the SCL. Note that the above-described DDC line is made up with the SDA lines and SCL line.

Also, the pin of which pin number is 19 is assigned to HPD/HEAC−. Also, the pin of which pin number is 14 is assigned to an Utility/HEAC+. Also, the pin of which pin number is 17 is assigned to a DDC/CEC Ground/HEAC Shield. Further, the pin of which pin number is 18 is assigned to a power source (+5V Power).

Next, pin assignment of the new HDMI will be described. This pin assignment of the new HDMI makes up the second pin assignment. FIG. 6(b) indicates pin assignment of this current HDMI. TMDS Data #i+ and TMDS Data #i− which are differential signals of the TMDS channel #i (i=0 through 5) are transmitted by two lines which are differential lines. Pins (the pins of which pin numbers are 1, 4, 7, 10, 2, and 8) are assigned to the TMDS Data #i+ and pins (the pins of which pin numbers are 3, 6, 9, 12, 5, and 11) are assigned to the TMDS Data #i−.

Also, a CEC signal to be data for control is transmitted with the CEC line. The pin of which pin number is 13 is assigned to the CEC signal. Also, an SDA (Serial Data) signal such as E-EDID is transmitted with the SDA line. The pin of which pin number is 16 is assigned to the SDA signal. Also, an SCL (Serial Clock) signal which a clock signal to be used for synchronization at the time of transmission and reception of the SDA signal is transmitted with the SCL line. The pin of which pin number is 15 is assigned to the SCL. Note that the above-described DDC line is made up with the SDA lines and SCL line.

Also, the pin of which pin number is 19 is assigned to HPD/HEAC−. Also, the pin of which pin number is 14 is assigned to Utility/HEAC+. Also, the pin of which pin number is 17 is assigned to DDC/CEC Ground/HEAC Shield. Further, the pin of which pin number is 18 is assigned to a power source (+5V Power).

As described above, with the new HDMI pin assignment (see FIG. 6(b)), terminals (which are pins of which pin numbers are 2, 5, 8, and 11), which are used as shield terminals with the current HDMI pin assignments (see FIG. 6(a)), are used as data terminals. Also, with the new HDMI pin assignment, terminals (which are pins of which pin numbers are 10 and 12), which are used as signal terminals of the differential signal of the clock signal with the current HDMI pin assignments, are used as data terminals.

The data transmission unit 112 of the source device 110 selects, when operating in the current HDMI operation mode, the current HDMI pin assignment illustrated in FIG. 6(a) and selects, when operating in the new HDMI operation mode, the new HDMI pin assignment illustrated in FIG. 6(b). Note that, with the above description, we have described pin assignment of the receptacle 111 of the source device 110. Further description will be omitted, but this is also the same as pin assignment of the receptacle 121 of the sink device 120 in the event of the data reception unit 122 of the sink device 120 being compatible with both the current HDMI and new HDMI.

FIGS. 7(a) and (b) illustrates pin array of the receptacle 111 of the source device 110. FIG. 7(a) illustrates pin array of the current HDMI, and FIG. 7(b) illustrates pin array of the new HDMI. Note that, when current HDMI pin assignment is selected as pin assignment of the receptacle 111, the pins of which pin numbers are 2, 5, 8, 11 are made to be in the following state. That is to say, the pins of which pin numbers are 2, 5, 8, 11 are made to be in the grounded state in the source device 110 and sink device 120. Alternatively, the pins of which pin numbers are 2, 5, 8, 11 are made to be in the grounded state in the sink device 120 and in the high impedance state in the source device 110. Alternatively, the pins of which pin numbers are 2, 5, 8, 11 are made to be in the high impedance state in the sink device 120 and in the grounding state in the source device 110. Note that, while further description will be omitted, this is the same for the pin array of the receptacle 121 of the sink device 120 in the event of the data reception unit 122 of the sink device 120 being compatible with both the current HDMI and new HDMI.

FIG. 8(a) illustrates a structure example of the current HDMI cable used as the cable 200. With this current HDMI cable, each of three data line pairs is configured of a shielded twisted pair portion to obtain properties. Also, the clock line pair and a line pair of utility and HPD also is configured of a shielded twisted pair portion for HEAC functions. FIG. 8(b) illustrates a structure example of a shielded twisted pair portion. This shielded twisted pair portion is a structure in which two electric wires 3 and a drain wire 4 have been covered with a shield member 5. Note that the electric wires 3 are configured by a core wire 1 being covered with a coating portion 2.

With the current HDMI cable, the drain lines making up each shielded twisted pair portion of the data and clock are connected to the plug pin attached to the end of this cable. In this case, the drain lines are connected to the pins (terminals) corresponding to each shielded terminal (which are shielded pins of which pin numbers are 2, 5, 8, and 11) of the above-described receptacle (pin assignment of the current HDMI). These shielded terminals are grounded in the source device 110 and sink device 120. Thus, the drain lines making up each shielded twisted pair portion of the data and clock are in the grounded state in the state where the plug is grounded to the receptacle (pin array of the current HDMI).

Figure 9:
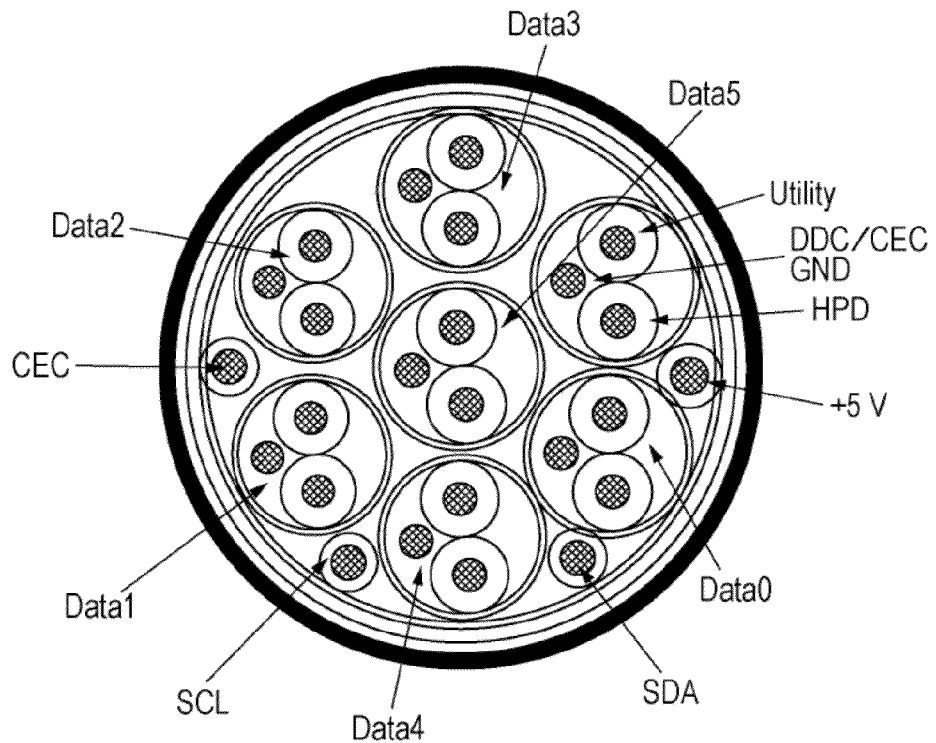
FIG. 9 is a diagram illustrating a structure example of a new HDMI cable.

FIG. 9 illustrates a structure example of the new HDMI cable used as the cable 200. With this new HDMI cable, each of six data line pairs is configured as a shielded twisted pair portion to obtain features. Also, the clock line pair and a line pair of utility and HPD also are configured as a shielded twisted pair portion for HEAC functions.

With the new HDMI cable, the number of individual copper lines to be connected is greater as compared to the current HDMI cable (see FIG. 8(a)). With this new HDMI cable, the drain lines making up each shielded twisted pair portion connected by dedicated pins at plugs at both ends of the cable are connected to the metal shell of the plug. Thus, shielded pins are freed, and increase of the number of the necessary pins of the plug is avoided, whereby the plug of the new HDMI cable is made to be the same as that of the current HDMI cable. In this way, with the drain lines making up each shielded twisted pair portion being connected to the metal shell of the plug, the shell of the receptacle where the plug is to be inserted is connected to ground level, thereby ensuring shielding of the differential pair line.

Figure 10:
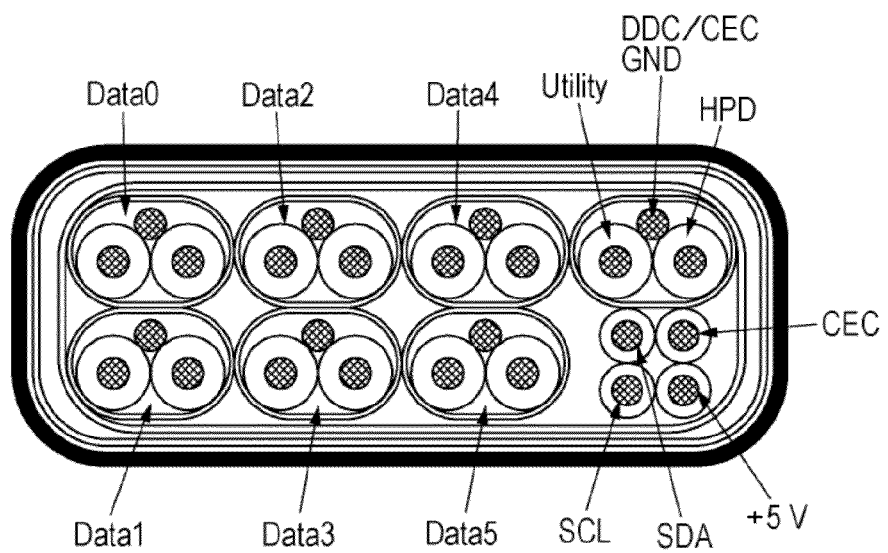
FIG. 10 is a diagram illustrating another structure example of the new HDMI cable.

FIG. 10 illustrates another structure example of the new HDMI cable to be used as the cable 200. With this new HDMI cable, except that the shape of the cross-sectional shape has been flattened, the substantial structure is the same as the new HDMI illustrated in FIG. 9 above. Note that flattening the cross-sectional shape of the configuration in this way enables the area to be smaller, and it is also known that impedance matching can be realized easily.

[Operation Mode Control of Current HDMI and New HDMI]

Next, description will be further made regarding operation mode control of the control unit 113 of the source device 110. As described above, in the event that determination is made that the cable 200 is compatible with the new HDMI and the sink device 120 is compatible with the new HDMI, the control unit 113 controls the data transmission unit 112 in the new HDMI operation mode. Otherwise, the control unit 113 controls the data transmission unit 112 in the current HDMI operation mode.

Figure 11:
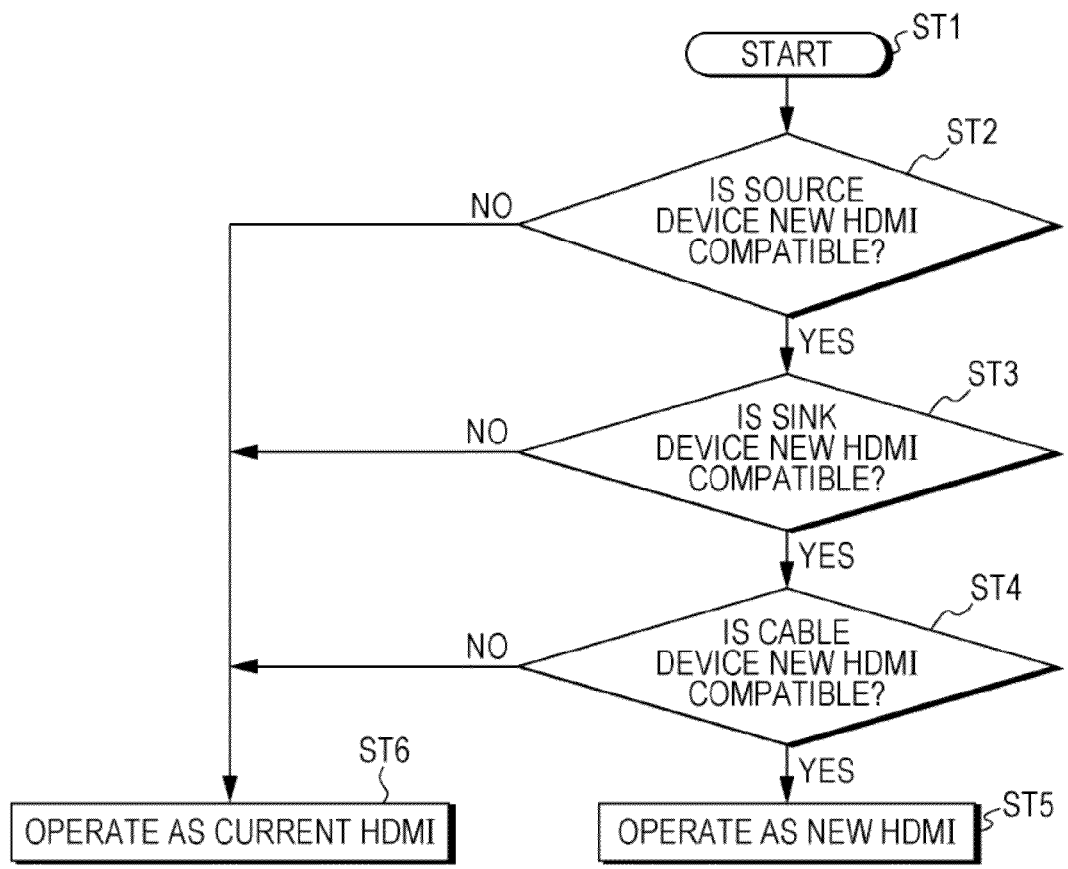
FIG. 11 is a flowchart illustrating an example of processing procedures of operation mode control of a control unit of the source device.

The flowchart in FIG. 11 illustrates processing procedures of the operation mode control in the control unit 113. In step ST1, the control unit 113 starts processing and then transitions to the processing in step ST2. In this step ST2, the control unit 113 determines whether or not the source device 110, i.e. the data transmission unit 112 is compatible with the new HDMI. Since the control unit 113 has been provided beforehand with capability information of the source device 110 (data transmission unit 112) where it exists, this determination can be made easily. Note that, according to this embodiment, it is obvious that the source device 110 is compatible with the new HDMI, so the control unit 113 can omit the determination processing in this step ST2.

In the event that determination is made that the source device 110 is compatible with the new HDMI, the control unit 113 determines whether or not the sink device 120, i.e., the data reception unit 113 is compatible with the new HDMI in step ST3. Details of this determination will be described later. In the event that determination is made that the sink device 120 is compatible with the new HDMI, the control unit 113 transitions to processing in step ST4. In this step ST4, the control unit 113 determines whether or not the cable 200 is compatible with the new HDMI. Details of this determination will be described later.

In the event that determination is made that the cable 200 is compatible with the new HDMI, the control unit 113 transitions to processing in step ST5. In this step ST5, the control unit 113 effects control so that the data transmission unit 112 operates in the new HDMI operation mode. Also, in the event that determination is made that in step ST2, step ST3, step ST4, respectively, the source device 110, sink device 120, cable 200 are not compatible with the new HDMI, the control unit 113 transitions to processing in step ST6. In this step ST6, the control unit 113 effects control so that the data transmitter unit 112 operates in the current HDMI operation mode.

Note that in the event that determination is made that the sink device 120 is compatible with the new HDMI in step ST3 for example, the control unit 113 transmits the determination result of the final operation mode to the sink device 120 via the cable 200. Transmitting of this judgment result is made as control information such as InfoFrame before performing data transmission from the source device 110, for example. At the sink device 120, based on the determination result from the source device 110, the control unit 123 effects control so that the data reception unit 122 operates in the same operation mode as with the data transmission unit 112 of the source device 110.

Also, in step ST5, when the data transmission unit 112 is controlled so as to be operated in the operation mode of the new HDMI, the control unit 113 may control, for example, as illustrated in FIG. 12(a), a UI screen to that effect, so as to display on the display unit (display). According to this UI screen, the user can easily comprehend that the source device 110 and sink device 120 have connected with the new HDMI. Note that display units (display) where the UI screen is displayed are an unshown display unit (display) provided in the source device 110, or an unshown display unit (display) provided in the sink device 120. This is also the same with reference to the following UI displays.

Also, when the control unit 113 determines that the cable 200 is not compatible with the new HDMI in step ST4 and transitions to processing in step ST6, control may be made so that a UI screen to that effect is displayed on the display unit (display), as illustrated in FIG. 12(c), for example. According to this UI screen, the user can easily recognize that the source device 110 and sink device 120 is compatible with the new HDMI, but only the cable 200 is not compatible with the new HDMI, and can take measures such as exchanging the cable 200 for the new HDMI cable.

Also, in the processing procedures of the flowchart in FIG. 11, when the control unit 113 controls that the cable 200 is compatible with the new HDMI in step ST4, and immediately transitions to step ST15, control is made that the data transmission unit 112 may operate in the new HDMI operation mode. However, when the control unit 113 determines in step ST4 that the cable 200 is compatible with the new HDMI, an arrangement may be made wherein a user can select one of the new HDMI or the current HDMI (conventional HDMI).

In this case, the control unit 113 controls the UI screen so as to display on the display unit (display), as illustrated in FIG. 12(b), for example. A user selects either of the new HDMI or current HDMI, based on this UI screen. FIG. 12(b) illustrates a state where "new HDMI" is selected. The control unit 113 effects control such that the data transmission unit 112 can operate in the new HDMI or current HDMI operation mode, in accordance with the user's selection.

Figure 13:
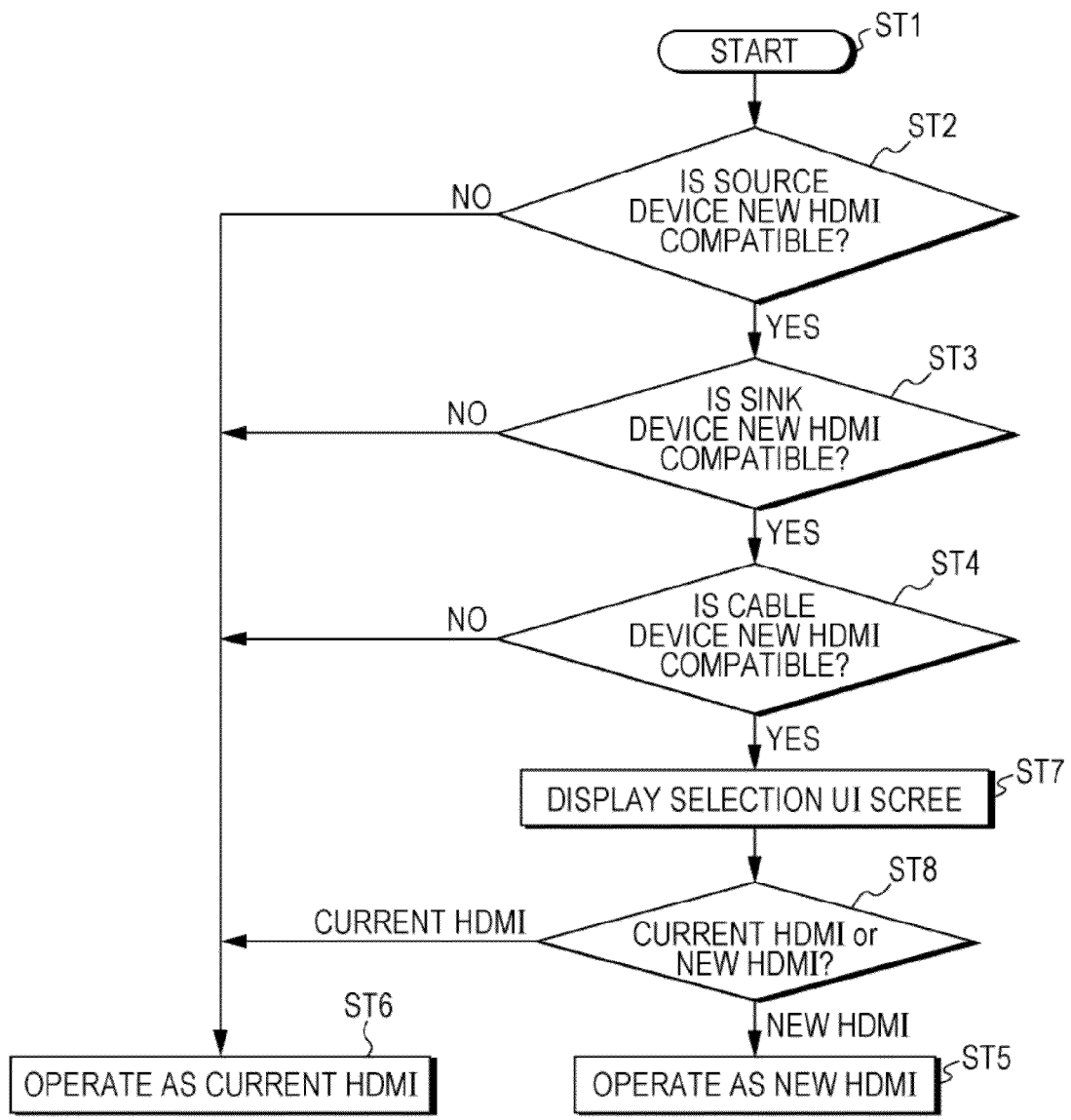
FIG. 13 is a flowchart illustrating another example of processing procedures of operation mode control of the control unit of the source device.

The flowchart in FIG. 13 illustrates processing procedures of the operation mode control of the control unit 113 in that case. In this FIG. 13, portions corresponding to those in FIG. 11 are denoted by the same reference numerals and detailed description will be omitted. In the event that determination is made that the cable 200 is compatible with the new HDMI in step ST4, the control unit 113 proceeds to the processing in step ST7. In this step ST7, the control unit 113 controls a UI screen to select either of the new HDMI or current HDMI so as to display on the display unit (display). This UI display may be transmitted by the source device 110 over the transmission path 200 as video signals, or the sink device 120 may be instructed to perform display itself.

The control unit 113 then transitions to processing in step ST8. In this step ST8, the control unit 113 determines if the user has selected either of the new HDMI or current HDMI, by the control unit 123 making notification of user operations with a remote controller through lines such as CEC. If the user has selected the new HDMI, the control unit 113 effects control in step ST5 so that the data transmission unit 112 operates in the new HDMI operation mode. On the other hand, if the user has selected the current HDMI, the control unit 113 effects control in step ST6 so that the data transmission unit 112 operates in the current HDMI (conventional HDMI) operation mode.

[Determination of Compatibility of Sink Device with New HDMI]

Description will be made regarding a determination method whether or not the sink device 120 in the control unit 113 is compatible with the new HDMI. As for this determination method, for example, there are the following first determination method and second determination method.

[First Determination Method]

The control unit 113 performs determination whether or not the sink device 120 is compatible with the new HDMI, based on the EDID read out using DDC lines (SDA line and SCL line) of the cable 200 from the sink device 120. The EDID itself has a data structure defined on the format. Let us say that in a predetermined place of this EDID, newly, flag information indicating whether or not the sink device 120 is compatible with the new HDMI (new transmission) is newly defined.

FIG. 14 illustrates an example of flag information newly defined on the EDID. Originally, EDID is a data structure indicating various capabilities of the sink device 120. FIG. 14 illustrates, for simplification of the description, of EDID, only bytes relating to this invention, so as to maximally simplify. In the second bit, one-bit flag information "New Rx Sink" indicating whether or not the sink device 120 is compatible with the new HDMI is described. Also, in the first bit, one-bit flag information "New Cable" indicating whether or not the cable 200 is compatible with the new HDMI is newly defined.

When the above-described 1-bit flag information "New Rx Sink" exists on the EDID read out from the sink device 122, the control unit 113 determines that the sink device 120 is compatible with the new HDMI. That is to say, in the event that the sink device 120 is compatible with the current HDMI, the above-described one-bit flag information "New Rx Sink" does not exist on the EDID read out from the sink device 122.

[Second Determination Method]

The control unit 113 makes determination regarding whether or not the sink device 120 is compatible with the new HDMI, by performing communication through the cable 200. For example, the control unit 113 confirms, using the CEC line, whether or not the sink device 120 is compatible with the new HDMI with regard to command base.

Also, for example, the control unit 113 performs communication between the sink device 120 using bidirectional communication (HEAC function) configured with the utility line and HPD line and confirms whether or not the sink device 120 is compatible with the new HDMI. Further, for example, the control unit 113 uses an unused line, for example utility line or the like, until transmission will be valid, performs exchanging some kind of signals, and confirms whether or not the sink device 120 is compatible with the new HDMI.

[Determination of Compatibility of Cable with New HDMI]

Next, description will be made regarding a determination method at the control unit 113 whether or not the cable 200 is compatible with the new HDMI. This determination method includes the following first through fourth determination methods. The first through third determination methods are, when the cable 200 is new HDMI, determination methods to be performed by using information providing function which this cable 200 has.

[First Determination Method]

Figure 15:
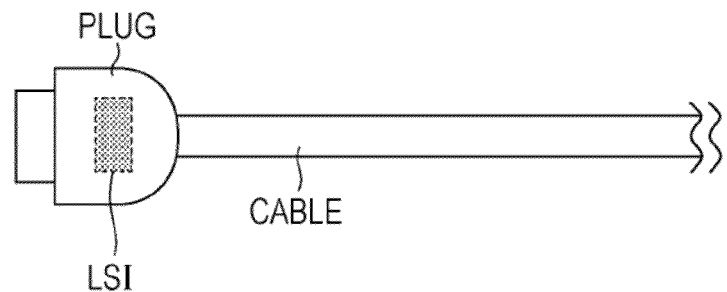
FIG. 15 is a diagram describing a determination method regarding whether or not a cable in the control unit is compatible with the new HDMI, and is a diagram illustrating an LSI built into a plug of the new HDMI.

In the case of this first determination method, as illustrated in FIG. 15, in the new HDMI cable, LSI (Large Scale Integration) is built in, for example in the plug. For example, in the state where +5 V is supplied from the source device 110, the sink device 120 requests output to this LSI by a CEC protocol during falling HPD into L. Note that, the sink device 120 in this case is a sink device compatible with the new HDMI. The LSI reports values of the resister embedded in this LSI (to the effect of being compatible with new HDMI, and cable property data such as data band that can be transmitted) to the sink device 120 with the CEC protocol, in response to an output request from the sink device 120.

The sink device 120 adds information reported from the LSI to its EDID. The sink device 120 instructs read-out of the EDID to the source device 110 by setting HPD to H after this addition. The control unit 113 makes determination whether or not the cable 200 is compatible with the new HDMI, based on the EDID read out from the sink device 120. That is to say, in the event that there is information to the effect or the like that the cable 200 is compatible with the new HDMI, the control unit 113 determines that the cable 200 is compatible with the new HDMI.

Note that, with the above description, description has made that the sink device 120 has requested output to the LSI with the CEC protocol. However, an arrangement can be conceived where the source device 110 itself requests output to the LSI with the CEC protocol and directly receives a report of resistor values (to the effect of being compatible with new HDMI, and cable property data such as data band that can be transmitted) from the LCI.

[Second Determination Method]

In the case of this second determination method as well, as illustrated in FIG. 15, an LSI is built in the new HDMI cable, for example in the plug. The source device 110, for example at the timing when the HPD changes from L to H, reads EDID indicating the capabilities from the sink device 120. In this case, the EDID is notified to the source side by using SDA/SCL line and performing serial transmission of data written in the EEPROM of the sink device 120.

The LSI observes a line where the EDID information is transmitted, i.e., SDA/SCL signals during transmission of the EDID. At the time of the flag information indicating whether or not the cable 200 is compatible with the new HDMI (the first bit of the predetermined byte in FIG. 14) being transmitted, the LSI changes the bit value in the state where the cable 200 is compatible with the new HDMI, i.e., in the state where the flag has been set. That is to say, the data on the EDIDROM (EEPROM) of the sink device 120 is "00000100", however, the LSI in the cable rewrites data during transmission so as to be "00000110" at the time of the source device 110 receiving.

The control unit 113 makes determination whether or not the cable 200 is compatible with the new HDMI, based on the EDID read out from the sink device 120. That is to say, in the state of the flag information indicating whether or not the cable 200 is compatible with the new HDMI (the first bit of the predetermined byte in FIG. 14) indicating compatibility with the new HDMI, the control unit 113 determines that the cable 200 is compatible with the new HDMI.

Figure 16:
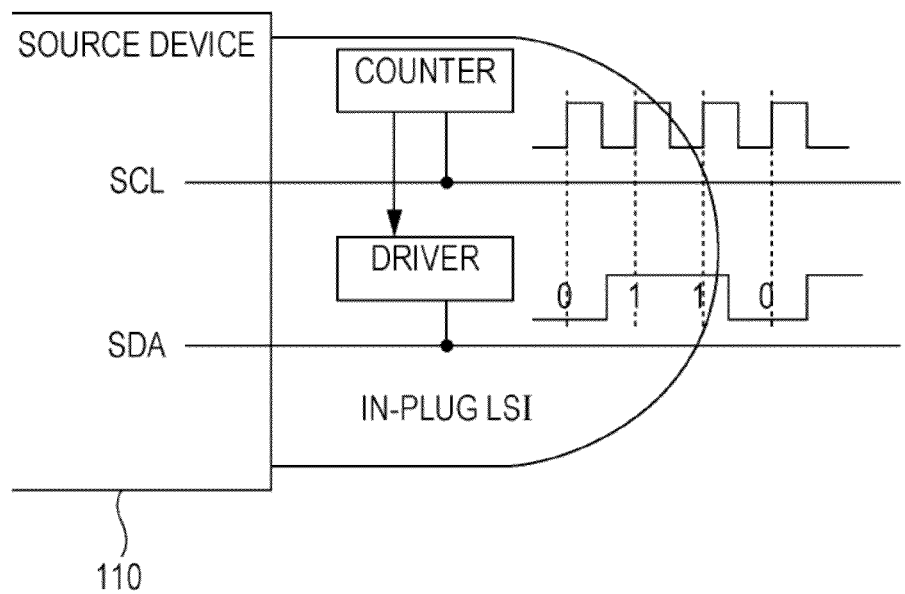
FIG. 16 is a diagram describing a determination method regarding whether or not the cable in the control unit is compatible with the new HDMI, and is a diagram illustrating an example of an EDID data rewrite circuit of an LSI within a new HDMI cable.

FIG. 16 illustrates an example of an EDID data rewrite circuit of in-cable LSI. This LSI has a counter which counts clocks on the SCL line and a driver to rewrite the data on the SDA line, based on the count values of this counter.

[Third Determination Method]

Figure 17:
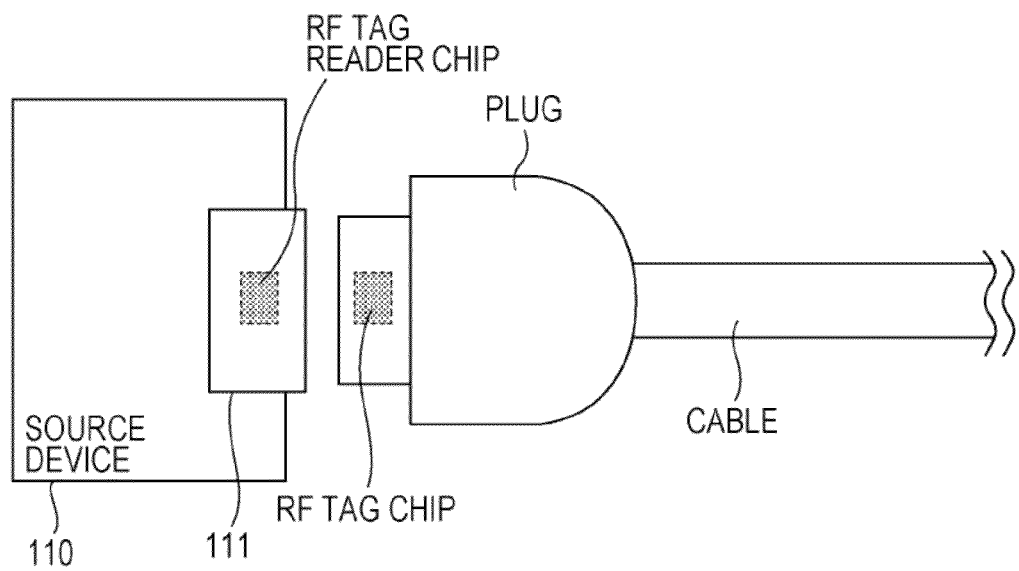
FIG. 17 is a diagram describing a determination method regarding whether or not the cable in the control unit is compatible with the new HDMI, and is a diagram illustrating an RF tag chip (LSI) built into the plug of the new HDMI.

In the case of this third determination method, as illustrated in FIG. 17, in the new HDMI cable, an RF tag chip (LSI) storing information such as information to the effect of compatibility with the new HDMI, data band which can be transmitted, and so forth, is built in, for example, in the plug. Also, an RF tag reader chip (LSI) is built in the receptacle 111 of the source device 110. In this case, near field communication is performed between the RF tag reader chip of the receptacle 111 and the RF tag chip of the flag, and information stored in the RF tag chip is read out by the RF tag reader chip.

The control unit 113 then makes determination whether or not the cable 200 is compatible with the new HDMI, based on the information read out from the RF tag readout chip. That is to say, when information that the cable 200 is compatible with the new HDMI from the RF tag readout chip is read out, the control unit 113 determines that the cable 200 is compatible with the new HDMI.

Note that with the above description, description has made that near field communication is performed between the RF tag reader chip of the receptacle 111 of the source device 110 and the RF tag chip of the plug, and the information stored in the RF tag chip is read out at the source device 110 side. However, an arrangement may be conceived as follows, for example. That is to say, near field communication is performed between the RF tag reader chip of the receptacle 121 of the sink device 120 and the RF tag chip of the plug, and stored information is read out to the RF tag chip on the sink device 120 side, and the information is then provided to the source device 110 side.

[Fourth Determination Method]

Figure 18:
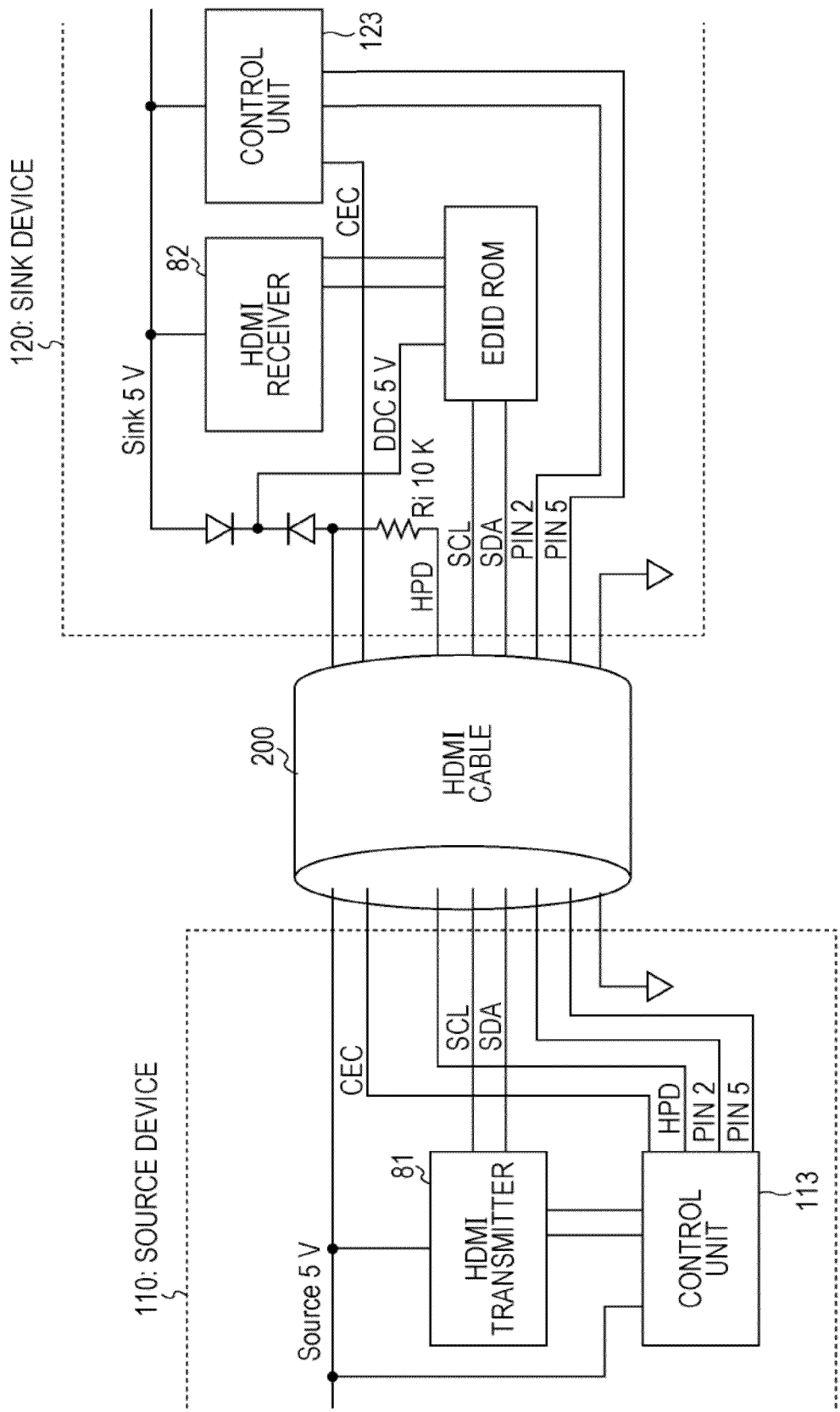
FIG. 18 is a diagram describing a determination method regarding whether or not the cable in the control unit is compatible with the new HDMI, and is a diagram describing determining of whether or not the cable in the control unit is compatible with the new HDMI, by performing measurement of the electrical properties of the cable.

In the case of this fourth determination method, the control unit 113 determines whether or not the cable 200 is compatible with the new HDMI, by performing measurement of the electrical properties. As illustrated in FIG. 18, the control unit 113 of the source device 110 sends a test signal for measurement and detection (digital signal) as to the pin 2 and pin 5, and the control unit 123 of the sink device 120 receives the signal. Note that, with the current HDMI cable, a pair of signal lines connected to the pins 2 and 5 do not make up a transmission path of the differential signal, however, with the new HDMI cable a pair of signal lines connected to the pins 2 and 5 make up a transmission path of the differential signal (FIGS. 6(a) and (b)).

The control unit 123 of the sink device 120 notifies the received digital signals to the source device 110 side through other paths (for example, a DDC line of the HDMI illustrated in SCL/SDA, or a CEC line, utility line, etc.). The control unit 113 of the source device 110 determines whether or not the cable 200 is compatible with the new HDMI, by confirming that the digital signals notified from the sink device 120 matches the digital signals which it itself has transmitted. That is to say, when the received digital signal matches the transmitted digital signal, the control unit 113 determines that the cable 200 is compatible with the new HDMI.

Figure 19:
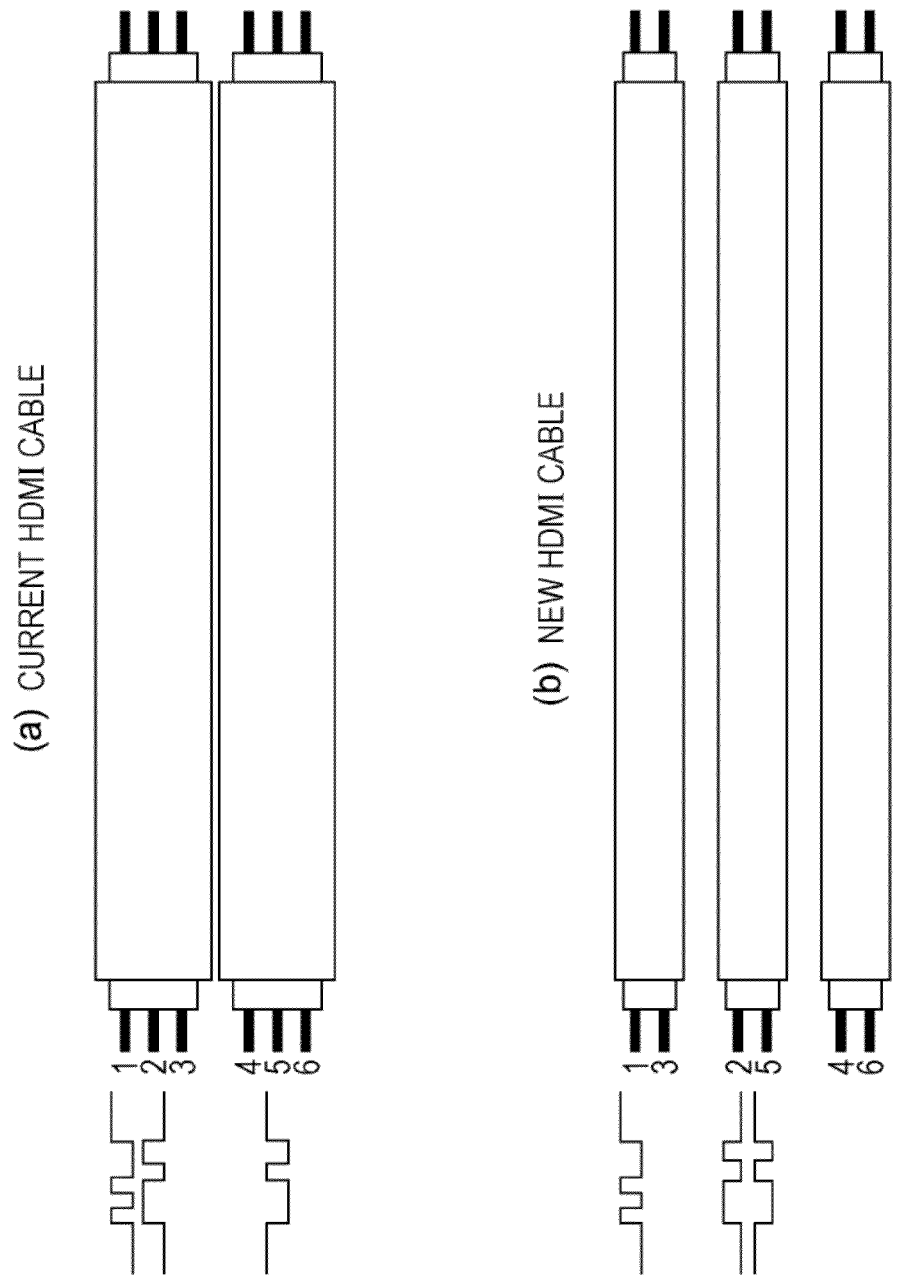
FIG. 19 is a diagram describing a determination method whether or not the cable is compatible with the new HDMI by performing measurement of the electrical properties of the cable.

As illustrated in FIG. 19(a), in the event that the cable 200 is the current HDMI cable, a pair of signal lines connected to the pins 2 and 5 is not a shielded twisted pair line. Accordingly, "high-speed test signal cannot be transmitted" is used for the determination that the cable 200 is compatible with the current HDMI. In this case, applying signals with no relation to the pin 2, to pin 1 or pin 3 which relate to the pin 2, enables using this interference. High-speed test signals are even less readily transmitted due to this interference.

On the other hand, as illustrated in FIG. 19(b), in the event that the cable 200 is the new HDMI cable, a pair of signal lines connected to the pins 2 and 5 is a shielded twisted pair line. Accordingly, "high-speed test signal can be transmitted" is used for the determination that the cable 200 is compatible with the new HDMI. In this case, even if signals with no relation to the pin 2 are applied to the pin 1 or pin 3, they are subjected to shielded processing independently, and interference between the applied signals and the pin 2 does not occur, so there is no influence on transmission of the test signal.

Here, the test signal is the fastest data that the source device 110 can output, and sufficiently long random data which can evaluate $10^{-9}$ which the HDMI guarantees as a bit error rate. Note that, frame buffer memory for video playback is built into the sink device 120 and this transmission-test-dedicated memory may not be needed.

Note that, with the above description, we have described the control unit 113 determines that the cable 200 is compatible with the new HDMI, only when the received digital signal matches the transmitted digital signal. The control unit 113 performs a similar test by slowing transfer rate of the data, repeats the above-described determination process until the received digital signal matches, and accordingly confirms the capabilities of the cable and determines the cable to be compatible with the new HDMI, but just enough transmission to be executable within the transmission speed may be performed. In this case, there is a possibility that the current HDMI cable may be determined to be compatible with the new HDMI, as well.

Also, with the above description, pin 2 and pin 5 are used. However, instead of these pins, pin 8 and pin 11 which have a similar relation between the current HDMI cable and new HDMI cable, may also be used. That is to say, with the current HDMI cable, a pair of signal lines connected to the pin 8 and pin 11 do not make up a transmission path of the differential signal, however, with the new HDMI cable, a pair of signal lines connected to the pin 8 and pin 11 with the cable make up a transmission path of the differential signal (see FIGS. 6(a) and (b)).

Also, with the above description, we have described that the digital signal (test signal) which the source device 110 has transmitted to the sink device, is received by the sink device 120 which notifies this to the source device 110, and the validity is determined at the source device 110 side. However, an arrangement may be made wherein the sink device 120 performs determination of the validity of the transmitted received digital signal, and only the result is notified to the source device 110 through the line such as CEC, or the information is added to its own E-EDID.

[Structure Example of Connector]

Figure 20:
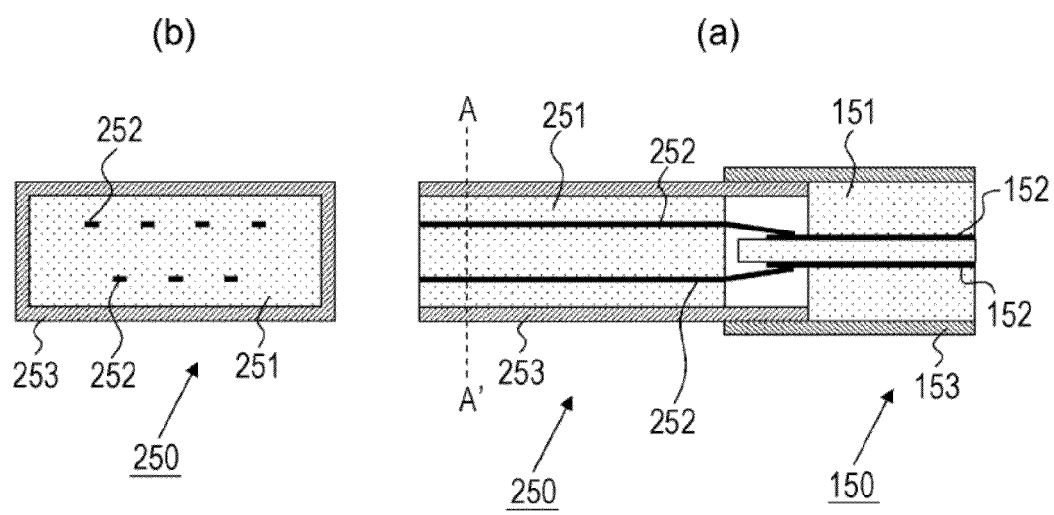
FIG. 20 is a diagram schematically illustrating a structure of a current HDMI connector (plug and receptacle).

FIG. 20 schematically illustrates the structure of the current HDMI connector (plug and receptacle). FIG. 20(a) is a longitudinal cross-sectional view illustrating a state where the plug 250 connected to the end of the cable 200, and the receptacle 150 included in the source device (transmission device) 110 or sink device (reception device) 120 are connected. FIG. 20(b) is, of FIG. 20(a), a transverse cross-sectional view along A-A', i.e., a transverse cross-sectional view of the plug 250.

The plug 250 has a dielectric 251, signal electrode pins 252, and a shell 253. The dielectric 251 is formed as a cuboid. In this dielectric 251, multiple signal electrode pins 252 extending in a first direction (horizontal direction in FIG. 20(a)) which is a predetermined axial direction of the cuboid, are arrayed.

These multiple signal electrode pins 252 are arrayed in a second direction (vertical direction in FIG. 20(a) and (b)) orthogonal to the first direction, and arrayed divided into a first stage (upper stage) and a second stage (lower stage). Multiple signal electrode pins 252 in each stage are arrayed with a predetermined interval in a third direction (horizontal direction in FIG. 20(b)) orthogonal to the first direction and second direction.

These multiple signal electrode pins 252 protrude with a predetermined length from the dielectric 251, on the connection end of the receptacle 150. The multiple signal electrode pins 252 in the first stage (upper stage) are in a state folded downward with a predetermined angle, for contacting and connecting with signal electrode pins corresponding to the later-described receptacle 150. Also, the multiple signal electrode pins 252 in the second stage (lower stage) are in a state folded upward with a predetermined angle, for contacting and connecting with signal electrode pins corresponding to the later-described receptacle 150.

The perimeter of the dielectric 251 is covered with a square-tube shell 253 opened in the first direction (horizontal direction in FIG. 20(*a*)). This shell 253 is configured of a conductor and is grounded when being used. That is to say, this shell 253 makes up a grounding conductor. Note that this shell 253 is extended at the edge portion of the dielectric 251 on the connection end side with the receptacle 150, and the protruding portion of the signal electrode pins 252 from the dielectric 251 is covered by these extended portions.

Also, the receptacle 150 has a dielectric 151, signal electrode pins 152, and a shell 153. This receptacle 150 is basically made to be the same structure with the above plug 250. That is to say, the dielectric 151 is formed as a cuboid. In this dielectric 151, multiple signal electrode pin 152 extending in the first direction (horizontal direction in FIG. 20(*a*)), which is the predetermined axial direction of the cuboid, are arrayed.

These multiple signal electrode pins 152 are arrayed in the second direction (vertical direction in FIG. 20(*a*)) orthogonal to the first direction, divided and arrayed into the first stage (upper stage) and second stage (lower stage). Multiple signal electrode pins 152 in each stage are arrayed with a predetermined interval in the third direction (the horizontal direction in FIG. 20(*b*)) orthogonal to the first direction and second direction.

These multiple signal electrode pins 152 protrude with a predetermined length from the dielectric 151, on the connection end of the plug 250. Here, a protruding portion which extends in the above-described third direction is formed on the connection end side with the plug 250 of the dielectric 151. The multiple signal electrode pins 152 in the first stage (upper stage) are in a state of being attached to the upper face of the protruding portion of the dielectric 151. Also, the multiple signal electrode pins 152 in the second stage (lower stage) are in a state of being attached to the lower face of the protruding portion of the dielectric 151.

The perimeter of the dielectric 151 is covered with a square-tube shell 153 opened in the first direction (horizontal direction in FIG. 20(*a*)). This shell 153 is configured of a conductor and is grounded when being used. That is to say, this shell 153 makes up a grounding conductor. Note that this shell 153 is extended at the edge portion of the dielectric 151 on the connection end side with the plug 250, and the protruding portion of the dielectric 151 where the signal electrode pins 152 are attached to the upper face and lower face is covered by these extended portions.

Figure 21:
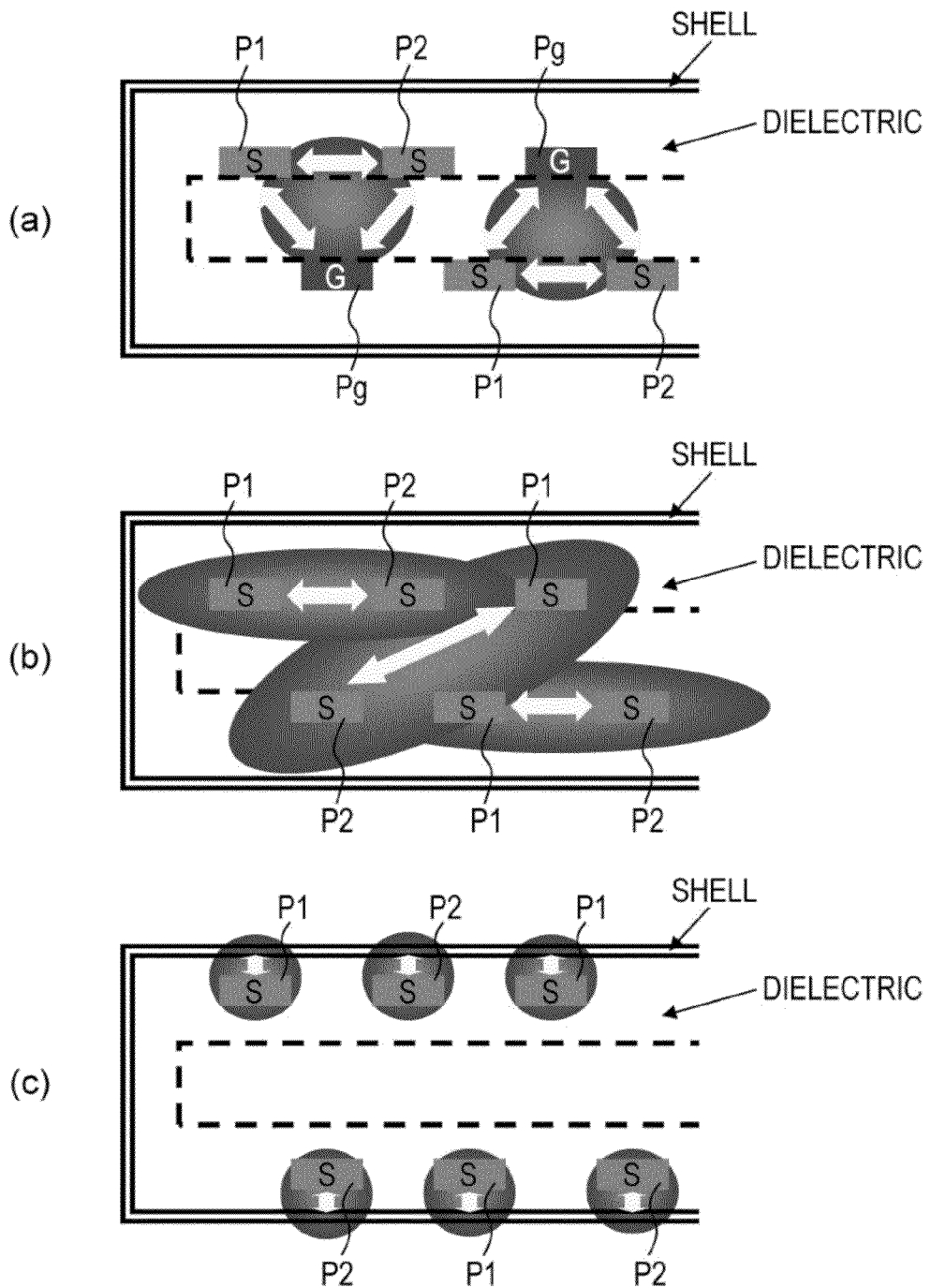
FIG. 21 is a diagram illustrating coupled relation of a pair of signal electrode pins P1 and P2 transmitting differential signals.

Here, quality of the signal transmission in the structure of the current HDMI connector (plug, receptacle) will be described. First, we will describe a case of operation with the pin array of the current HDMI illustrated in the above-described FIG. 7(*a*). In this case, transmission (sending and receiving) of the signal with high quality is enabled. In this case, as illustrated in FIG. 21(*a*), the array distance of a pair of signal electrode pins P1 and P2 transmitting the differential signals is short, and a signal electrode pin Pg for shielding corresponding to this pair of the signal electrode pins P1 and P2 also exists. In this case, this is a three-line structure with the differential signals and shielding and good coupling can be realized, whereby transmission with good signal quality is enabled.

Figure 22:
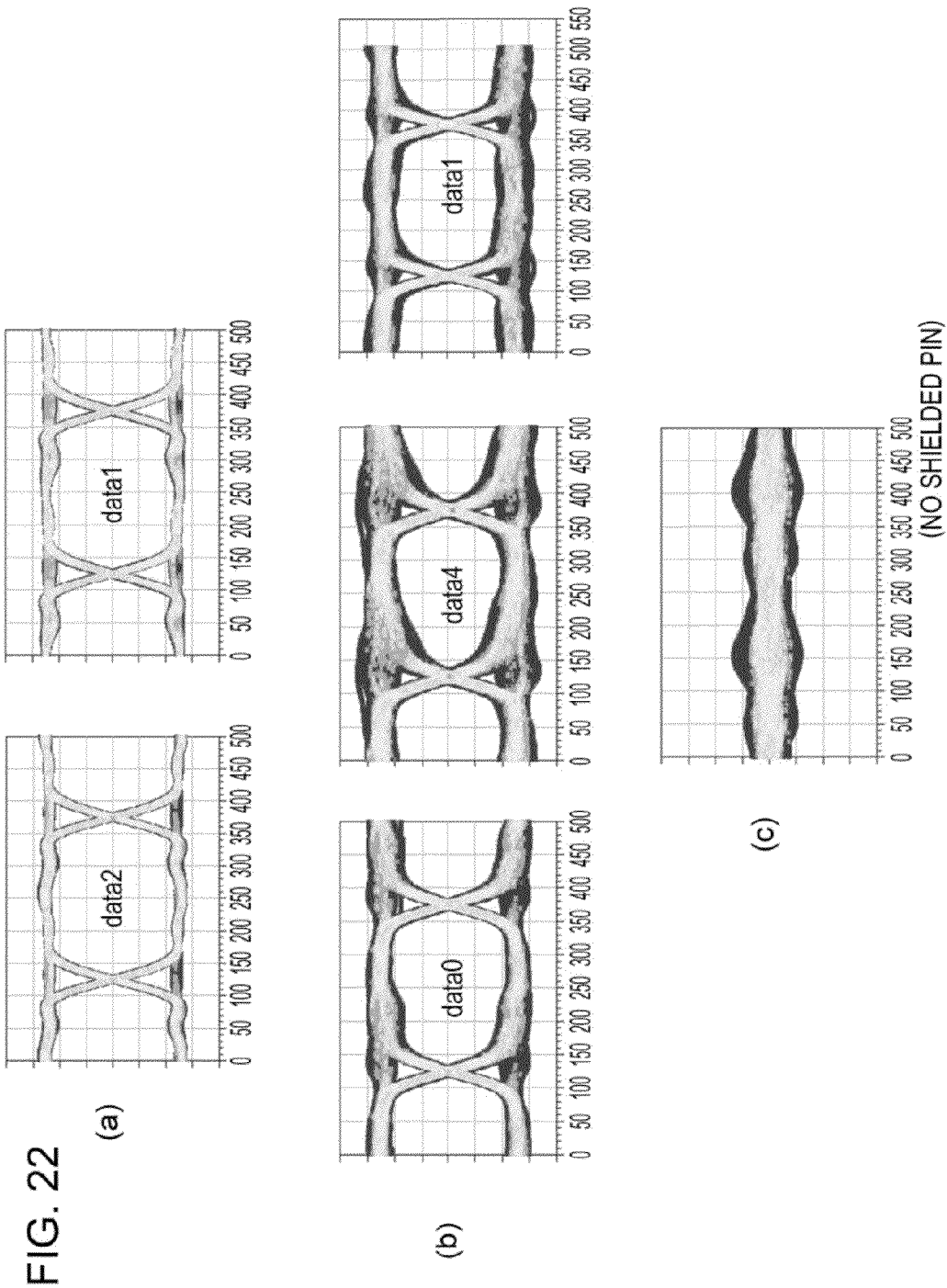
FIG. 22 is a diagram describing a data observation waveform in the event of operating with the pin assignment of the current HDMI and the pin assignment of the new HDMI, in the current HDMI connector (plug and receptacle).

FIG. 22(*a*) illustrates data observation waveforms of the TMDS channels #2 and #1 at the output side of the plug 250 through the receptacle 150 and plug 250 in the event of transmitting 4 Gbps data at each of the TMDS channels #0 through #2. Here, "data2" illustrates data of the TMDS channel #2, and signal electrode pins of pin numbers 1 to 3 are used, and transmitted (see FIG. 6(*a*) and FIG. 7(*a*)). Also, "data1" illustrates data of the TMDS channel #1, and signal electrode pins of pin numbers 4 to 6 are used, and transmitted (see FIG. 6(*a*) and FIG. 7(*a*)).

Next, description will be made regarding a case of operations with the pin array of the new HDMI illustrated in above-described FIG. 7(*b*). In this case, transmission (sending and receiving) of the signal with high quality becomes difficult. In this case, as illustrated in FIG. 21(*b*), the signal electrode pin Pg for shielding, corresponding to a pair of signal electrode pins P1 and P2 transmitting the differential signal, does not exist.

Accordingly, coupling between each one pair of the signal electrode pins P1 and P2 becomes weak. Particularly, in the case of a pair of the signal electrode pins P1 and P2 converted from the signal electrode pin Pg for shielding in the pin array of the current HDMI, the array distance is long and the coupling between the pair of signal electrode pins P1 and P2 becomes very weak. Therefore, in each one pair of signal electrode pins P1 and P2, interference between other signal electrode pins electromagnetically increases, i.e., crosstalk from other signal electrode pins increases, and transmission of the signal with high quality becomes difficult.

FIG. 22(*b*) illustrates data observation waveforms of the TMDS channels #0, #4, and #1 at the output side of the plug 250, in the event of transmitting 4 Gbps data at each of the TMDS channels #0 through #5 through the receptacle 150 and plug 250. Here, "data0" illustrates data of the TMDS channel #0, and signal electrode pins of pin numbers 1, 3 are used, and transmitted (see FIG. 6(*b*) and FIG. 7(*b*)). Also, "data4" illustrates data of the TMDS channel #4, and signal electrode pins of pin numbers 2, 5 are used, and transmitted (see FIG. 6(*b*) and FIG. 7(*a*)). Further, "data1" illustrates data of the TMDS channel #1, and signal electrode pins of pin numbers 4, 6 are used, and transmitted (see FIG. 6(*b*) and FIG. 7(*b*)).

With the data observation waveforms of these TMDS channels #0, #4, #1, it can be seen that waveforms have deteriorated as compared to the data observation waveforms illustrated in FIG. 22(*a*). In this case, not only data "data4" of the TMDS channel #4 but also data "data0" of the TMDS channels #0 and #1 and "data1" have greatly deteriorated due to crosstalk from the other signal electrode pins.

FIG. 22(*c*) illustrates crosstalk observation waveform observed in a pair of signal electrode pins P1 and P2 of the TMDS channel #4. In this case, except the TMDS channel #4, it was observed in the state where transmitted data of 4 Gbps in each of the TMDS channels #0 through #3, and #5, through the receptacle 150 and plug 250.

As described above, transmission (sending and receiving) of the signal with high quality becomes difficult in the event of operating in a structure of the current HDMI connector (plug and receptacle) in pin array of the new HDMI. An example of improved structure of the HDMI connector (improved structure example 1 through improved structure example 4) will be described below.

[Improved Structure Example 1]

Figure 23:
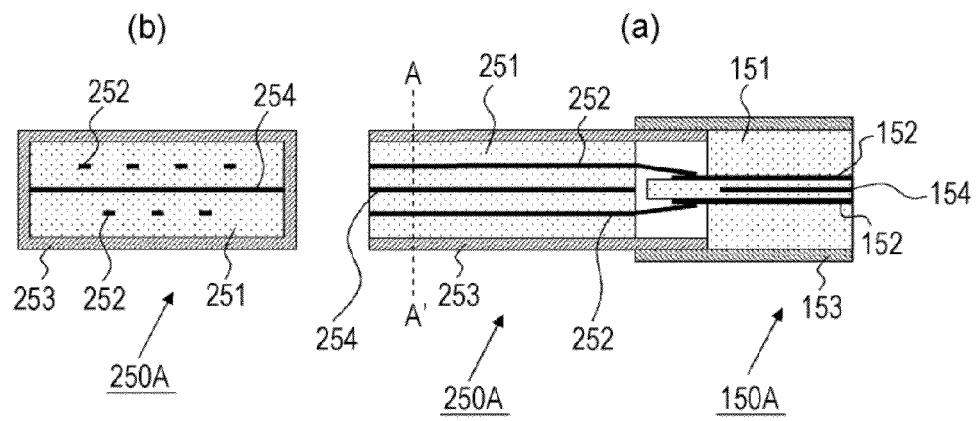
FIG. 23 is a diagram schematically illustrating an improved structure example 1 of the HDMI connector (plug and receptacle).

FIG. 23 schematically illustrates an improved structure example 1 of the HDMI connector (plug, receptacle). FIG. 23(a) is a longitudinal cross-sectional view indicating the state where the plug 250A connected to the end portion of the cable 200 and the receptacle 150A included in the source device (transmission device) 110 or sink device (reception device) 120 has been connected. FIG. 23(b) is a transverse cross-sectional view along line A-A' in FIG. 23(a), i.e., a transverse cross-sectional view of the plug 250A. In this FIG. 23, portions corresponding to FIG. 20 are denoted with the same reference numerals.

The plug 250A has a dielectric 251, signal electrode pins 252, a shell 253, and a ground plane 254. The dielectric 251 is formed as a cuboid. In this dielectric 251, multiple signal electrode pins 252 are arrayed in the first direction (horizontal direction in FIG. 23(a)) which is a predetermined axial direction of the cuboid.

These multiple signal electrode pins 252 are arrayed in the second direction (vertical direction in FIG. 23(a) and (b)) orthogonal to the first direction, divided and arrayed into a first stage (upper stage) and second stage (lower stage). Multiple signal electrode pins 252 in each stage are arrayed with a predetermined interval in the third direction (horizontal direction in FIG. 23(b)) orthogonal to the first direction and second direction.

These multiple signal electrode pins 252 protrude with a predetermined length from the dielectric 251, at the connection end of the receptacle 150A. The multiple signal electrode pins 252 in the first stage (upper stage) are in a state folded downward with a predetermined angle, for contacting and connecting with signal electrode pins corresponding to the later-described receptacle 150A. Also, the multiple signal electrode pins 252 in the second stage (lower stage) are in a state folded upward with a predetermined angle, for contacting and connecting with signal electrode pins corresponding to the later-described receptacle 150A.

Also, in the dielectric 251, a thin-plate ground plane 254 is disposed. This ground plane 254 is placed between the multiple signal electrode pins 252 of the first stage (upper stage) and the multiple signal electrode pin 252 of the second stage (lower stage). This ground plane 254 is configured of a conductor and is grounded when used. For example, this ground plane 254 is electrically connected to the later-described shell 253 in the above-described third direction (horizontal direction in FIG. 23(b)).

The perimeter of the dielectric 251 is covered with a square-tube shell 253 opened in the first direction (horizontal direction in FIG. 23(a)). This shell 253 is configured of a conductor and is grounded when used. That is to say, this shell 253 makes up a grounding conductor. Note that this shell 253 is extended by the edge portion of the dielectric 251 on the connection end side with the receptacle 150A, and the protruding portion of the signal electrode pins 252 from the dielectric 251 is covered by these extended portions.

Also, the receptacle 150A has a dielectric 151, signal electrode pins 152, a shell 153, and a ground plane 154. This receptacle 150A is basically made to be the same structure with the above plug 250A. That is to say, the dielectric 151 is formed as a cuboid. In this dielectric 151, multiple signal electrode pins 152 extending in the first direction (horizontal direction in FIG. 23(a)), which is the predetermined axial direction of the cuboid, are arrayed.

These multiple signal electrode pins 152 are arrayed in the second direction (vertical direction in FIG. 23(a)) orthogonal to the first direction, divided and arrayed into the first stage (upper stage) and second stage (lower stage). Multiple signal electrode pins 152 in each stage are arrayed with a predetermined interval in the third direction (the horizontal direction in FIG. 23(b)) orthogonal to the first direction and second direction.

These multiple signal electrode pins 152 protrude with a predetermined length from the dielectric 151, on the connection end of the plug 250A. Here, a protruding portion which extends in the above-described third direction is formed on the connection end side with the plug 250A of the dielectric 151. The multiple signal electrode pins 152 in the first stage (upper stage) are made in a state of being attached to the upper face of the protruding portion of the dielectric 151. Also, the multiple signal electrode pins 152 in the second stage (lower stage) are made in a state of being attached to the lower face of the protruding portion of the dielectric 151.

Also, in the dielectric 151, a thin-plate ground plane 154 is disposed. This ground plane 154 is placed between the multiple signal electrode pins 152 of the first stage (upper stage) and the multiple signal electrode pin 152 of the second stage (lower stage). This ground plane 154 is configured of a conductor and is grounded when used. For example, this ground plane 154 is electrically connected to the later-described shell 153 in the above-described third direction (horizontal direction in FIG. 23(b)).

The perimeter of the dielectric 251 is covered with a square-tube shell 153 opened in the first direction (horizontal direction in FIG. 23(a)). This shell 153 is configured of a conductor and is grounded when used. That is to say, this shell 153 makes up a grounding conductor. Note that this shell 153 is extended at the edge portion of the dielectric 151 on the connection end side with the plug 250A, and the protruding portion from the dielectric 151 where the signal electrode pins 152 are attached on the upper face and lower face is covered by these extended portions.

In the improved structure example 1 of the HDMI connector illustrated in FIG. 23, ground planes 254 and 154 are placed within the dielectrics 251 and 151 of the plug 250A and receptacle 150A. Therefore, at the plug 250A and receptacle 150A, the signal electrode pins 252 and 152 of the first stage (upper stage) and the signal electrode pins 252 and 152 of the second stage (lower stage) are divided with these ground planes 254 and 154, and crosstalk therebetween is reduced. Therefore, as compared with the current HDMI connector (plug and receptacle) illustrated in FIG. 20, in the pair of the signal electrode pins transmitting the differential signals, crosstalk from other signal electrode pins can be reduced, and transmission of signal with high quality is enabled.

Figure 27:
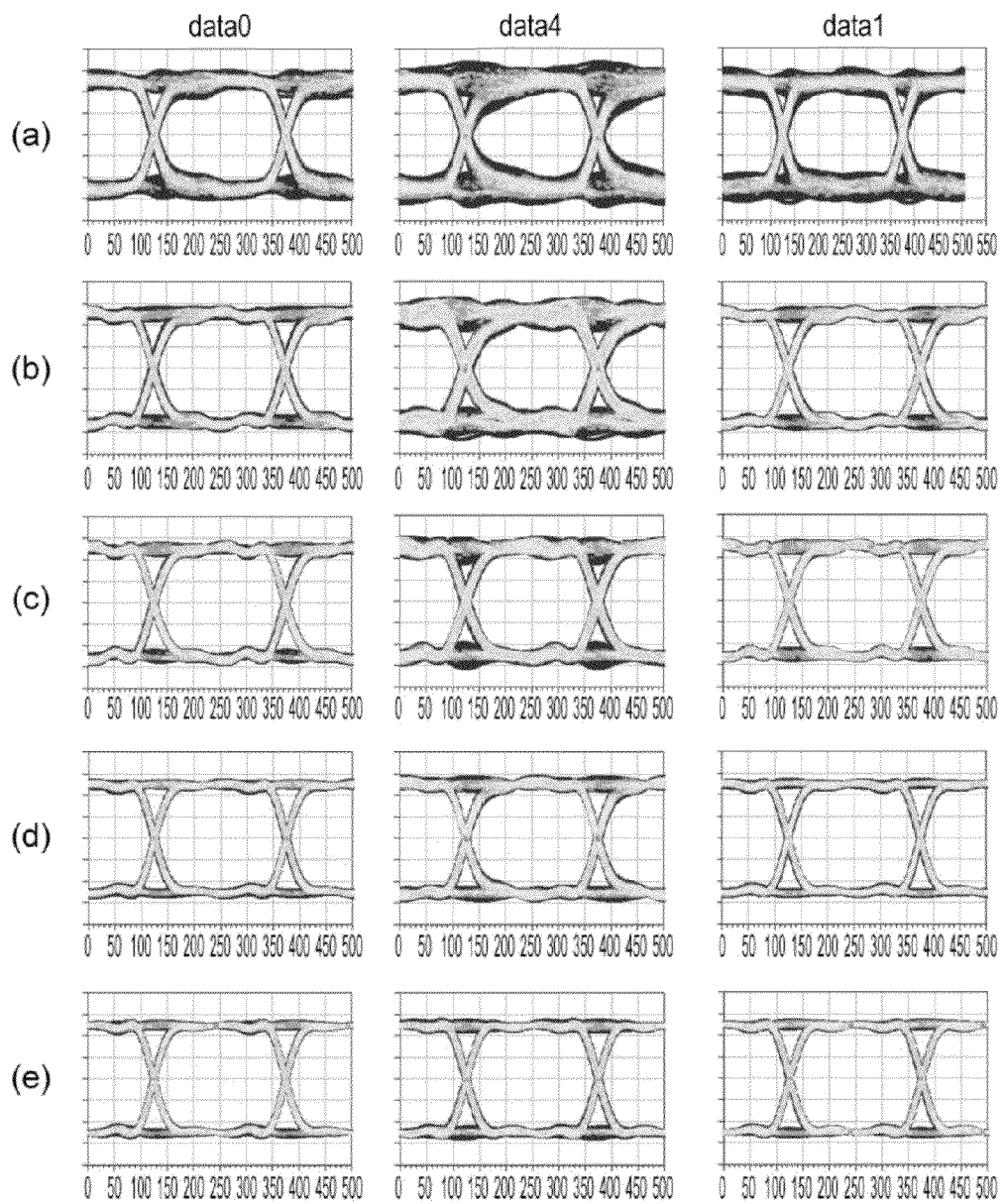
FIG. 27 is a diagram comparing and illustrating the data observation waveforms of the current HDMI and improved structure examples 1 through 4.

FIG. 27(b) illustrates data observation waveforms of the TMDS channels #0, #4, and #1 at the output side of the plug 250A in the event that data of 4 Gbps is transmitted at each of the TMDS channels #0 to #5 through the receptacle 150A and plug 250A. Note that FIG. 27(a) illustrates, similar to the above-described FIG. 22(b), data observation waveforms of the TMDS channels #0, #4, and #1 in the structure of the current HDMI connector (see FIG. 20). It can be seen from the data observation waveforms of the TMDS channels #0, #4, and #1 illustrated in FIG. 27(b) that waveform deterioration is improved as compared with the data observation waveforms illustrated in FIG. 27(a).

Figure 28:
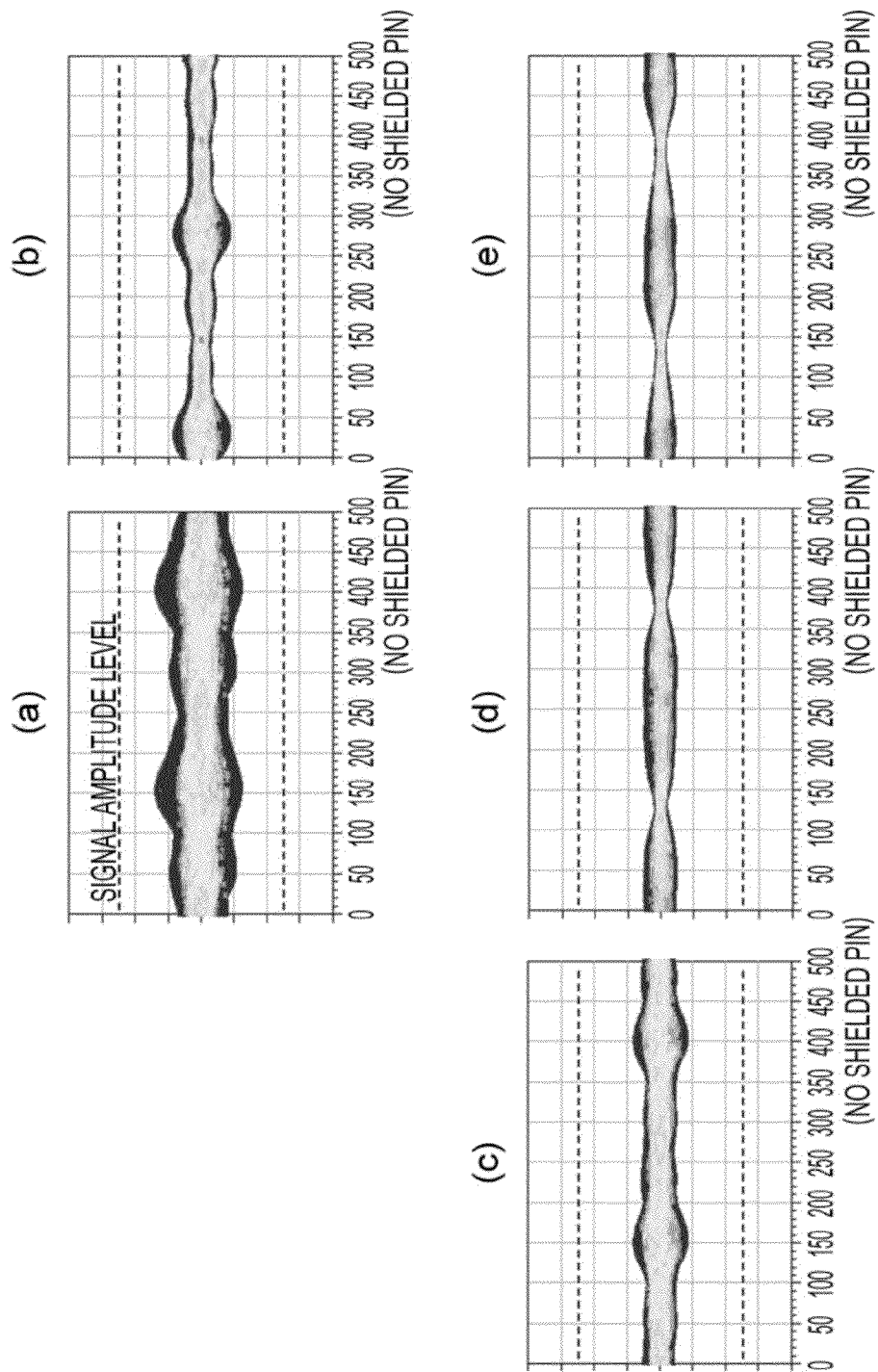
FIG. 28 is a diagram comparing and illustrating crosstalk observation waveforms of the current HDMI and improved structure examples 1 through 4.

FIG. 28(b) illustrates a crosstalk observation waveform observed in a pair of the signal electrode pins P1 and P2 of the TMDS channel #4. In this case, observation was made in the state of transmitting 4 Gbps data through the receptacle 150A and plug 250A in each of the TMDS channels #0 to #3, and #5, except for the TMDS channel #4. FIG. 28(a) illustrates, similar to the above-described FIG. 22(c), a crosstalk observation waveform observed in a pair of signal electrode pins P1 and P2 of the TMDS channel #4 in the structure of the current HDMI connector (see FIG. 20). It can be seen from the crosstalk observation waveform of the TMDS channel #4 illustrated in FIG. 28(b), as compared with the crosstalk observation waveform illustrated in FIG. 28(a), the level thereof becomes smaller.

[Improved Structure Example 2]

Figure 24:
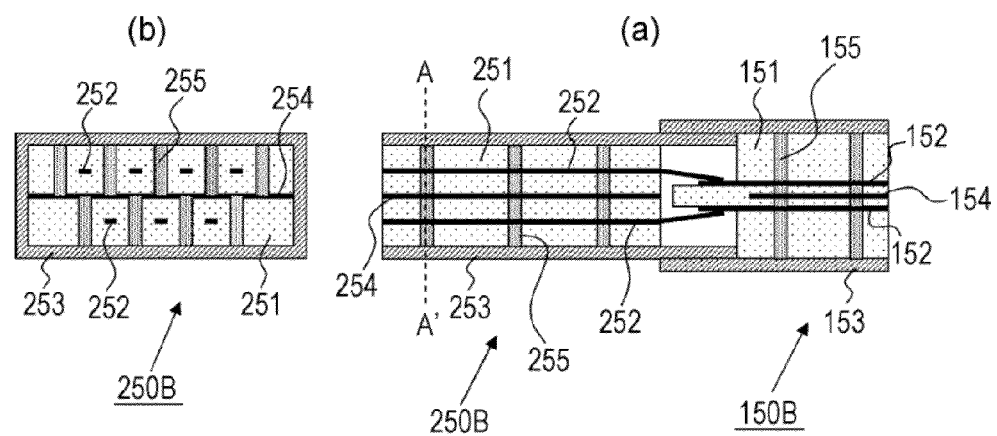
FIG. 24 is a diagram schematically illustrating an improved structure example 2 of the HDMI connector (plug and receptacle).

FIG. 24 schematically illustrates an improved structure example 2 of the HDMI connector (plug, receptacle). FIG. 24(a) is a longitudinal cross-sectional view indicating the state where the plug 250B connected to the end portion of the cable 200 and the receptacle 150B included in the source device (transmission device) 110 or sink device (reception device) 120 have been connected. FIG. 24(b) is a transverse cross-sectional view along line A-A' in FIG. 24(a), i.e., a transverse cross-sectional view of the plug 250B. In this FIG. 24, portions corresponding to FIG. 23 are denoted with the same reference numerals and further description will be omitted, as appropriate.

The plug 250B has a dielectric 251, signal electrode pins 252, a shell 253, ground plane 254, and vias (via) 255 as connecting conductors. With this plug 250B, in the dielectric 251, vias 255 electrically connecting the ground plane 254 and shell 253, i.e., plated holes, are formed. the vias 255 are formed between each signal electrode pin 252 on the first stage (upper stage) and each signal electrode pin 252 on the second stage (lower stage). While further description will be omitted, other structures of the plug 250B are made to be the same as that of the plug 250A in the improved configuration example 1 illustrated in FIG. 23.

Also, the receptacle 150B has a dielectric 151, signal electrode pins 152, a shell 153, a ground plane 154, and vias (via) 255 as connecting conductors. With this receptacle 150B, in the dielectric 151, vias 155 electrically connecting the ground plane 154 and shell 153, i.e., plating holes, are formed. The vias 155 are formed between each signal electrode pin 152 on the first stage (upper stage) and each signal electrode pin 152 on the second stage (lower stage). While further description will be omitted, other structures of the receptacle 150B are the same as those of the receptacle 150A in the improved configuration example 1 illustrated in FIG. 23.

In the improved structure example 2 of the HDMI connector illustrated in FIG. 24, ground planes 254 and 154 are placed within the dielectrics 251 and 151 of the plug 250B and receptacle 150B. Therefore, in the plug 250B and receptacle 150B, the signal electrode pins 252 and 152 of the first stage (upper stage) and the signal electrode pins 252 and 152 of the second stage (lower stage) are divided with these ground planes 254 and 154, and crosstalk therebetween is reduced.

Further, with this improved structure example 2, the vias 255 and 155 are formed in the dielectrics 251 and 151 of the plug 250B and receptacle 150B. Therefore in the plug 250B and receptacle 150B, crosstalk between the signal electrode pins 252 and 152 of each stage is reduced. Accordingly, with this improved structure example 2, in a pair of signal electrode pins transmitting differential signals, crosstalk from other signal electrode pins can be further reduced as compared to the improved structure example 1 illustrated in the above-described FIG. 23, and higher quality signals can be transmitted.

FIG. 27(c) illustrates data observation waveforms of the TMDS channels #0, #4, and #1 at the output side of the plug 250B in the event of transmitting 4 Gbps data through the receptacle 150B and plug 250B in each of the TMDS channels #0 through #5. It can be seen that waveform deterioration is further improved with the data observation waveforms of the TMDS channels #0, #4, and #1 illustrated in FIG. 27(c), as compared with the data observation waveforms illustrated in FIG. 27(b) of the above-described improved structure example 1 (see FIG. 23).

FIG. 28(c) illustrates crosstalk observation waveforms observed in a pair of the signal electrode pins P1 and P2 of the TMDS channel #4. In this case, observation was made in the state of transmitting 4 Gbps data through the receptacle 150B and plug 250B in each of the TMDS channels #0 to #3, and #5, excluding the TMDS channel #4. It can be seen that the level becomes smaller for the crosstalk observation waveforms of the TMDS channel #4 illustrated in FIG. 28(c) as compared with the crosstalk observation waveforms illustrated in FIG. 28(b) according to the above-described improved structure example 1 (see FIG. 23).

[Improved Structure Example 3]

Figure 25:
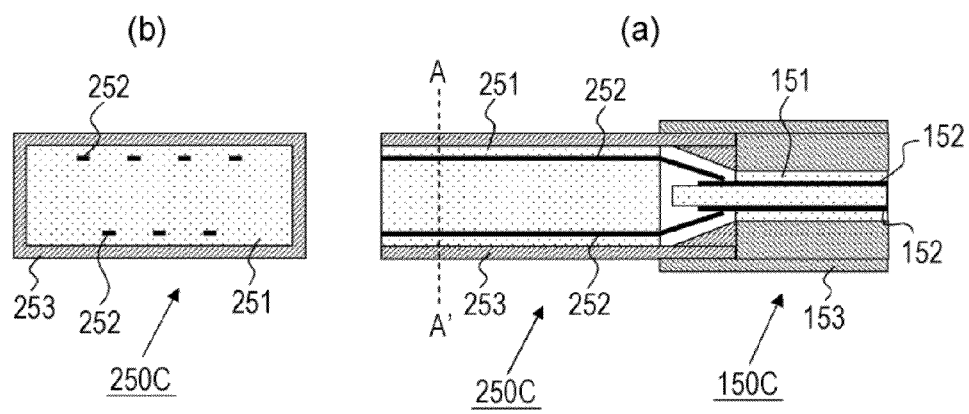
FIG. 25 is a diagram schematically illustrating an improved structure example 3 of the HDMI connector (plug and receptacle).

FIG. 25 schematically illustrates an improved structure example 3 of the HDMI connector (plug, receptacle). FIG. 25(a) is a longitudinal cross-sectional view indicating the state where the plug 250C connected to the end portion of the cable 200 and the receptacle 150C included in the source device (transmission device) 110 or sink device (reception device) 120 has been connected. FIG. 25(b) is a transverse cross-sectional view along line A-A' in FIG. 25(a), i.e., a transverse cross-sectional view of the plug 250C. In this FIG. 25, portions corresponding to FIG. 20 are denoted with the same reference numerals and further description will be omitted, as appropriate.

The plug 250C has a dielectric 251, signal electrode pins 252, and a shell 253. The dielectric 251 is formed as a cuboid. In this dielectric 251, multiple signal electrode pins 252 are arrayed extending in the first direction (horizontal direction in FIG. 25(a)) which is a predetermined axial direction of the cuboid.

These multiple signal electrode pins 252 are arrayed in the second direction (vertical direction in FIGS. 25(a) and (b)) orthogonal to the first direction, divided and arrayed into the first stage (upper stage) and second stage (lower stage). Multiple signal electrode pins 252 in each stage are arrayed with a predetermined interval in the third direction (the horizontal direction in FIG. 25(b)) orthogonal to the first direction and second direction.

These multiple signal electrode pins 252 protrude with a predetermined length from the dielectric 251, on the connection end of the receptacle 150C. The multiple signal electrode pins 252 in the first stage (upper stage) are in a state folded downward with a predetermined angle, for contacting and connecting with signal electrode pins corresponding to the later-described receptacle 150C. Also, the multiple signal electrode pins 252 in the second stage (lower stage) are in a state folded upward with a predetermined angle, for contacting and connecting with signal electrode pins corresponding to the later-described receptacle 150C.

The perimeter of the dielectric 251 is covered with a square-tube shell 253 opened in the first direction (horizontal direction in FIG. 25(a)). This shell 253 is made up of a conductor and is grounded when used. That is to say, this shell 253 makes up a grounding conductor. Note that this shell 253 is extended at the edge portion of the dielectric 251 on the connection end side with the receptacle 150C, and the portion where the signal electrode pins 252 protrude from the dielectric 251 is covered by these extended portions.

In this plug 250C, each signal electrode pin 252 of the first stage (upper stage) and each signal electrode pin 252 of the second stage (lower stage) is set close to the shell 253 as compared with the structure of the current HDMI connector illustrated in FIG. 20. Thereby, each signal electrode pin 252 is coupled to the shell 253, and the differential signals are transmitted with single end. That is to say, electromagnetic field of the transmitting signal is coupled so as to be distributed between each signal electrode pin 252 and the shell 253, each signal electrode pin 252 is placed close to the shell 253 and the differential signals are transmitted with single end. The structure is such that the protruding portion of the signal electrode pins 252 from the dielectric 251 at the connection end of the receptacle 150C is closer to the shell 253, as illustrated in the diagram, by a thick portion being formed to the later-described shell 253 along with the folding angle of this protruding portion.

Also, the receptacle 150C has a dielectric 151, signal electrode pins 152, and a shell 153. This receptacle 150C is basically made to be the same structure with the above plug 250C. That is to say, the dielectric 151 is formed as a cuboid. In this dielectric 151, multiple signal electrode pins 152 are arrayed extending in the first direction (horizontal direction in FIG. 25(a)) which is the predetermined axial direction of the cuboid.

These multiple signal electrode pins 152 are arrayed in the second direction (a vertical direction in FIG. 25(a)) orthogonal to the first direction, divided and arrayed into the first stage (upper stage) and second stage (lower stage). Multiple signal electrode pins 152 in each stage are arrayed with a predetermined interval in the third direction (the horizontal direction in FIG. 25(b)) orthogonal to the first direction and second direction.

These multiple signal electrode pins 152 protrude with a predetermined length from the dielectric 151, at the connection end of the plug 250C. Here, a protruding portion which extends in the above-described third direction is formed on the connection end side with the plug 250C of the dielectric 151. The multiple signal electrode pins 152 in the first stage (upper stage) are in a state of being attached to the upper face of the protruding portion of the dielectric 151. Also, the multiple signal electrode pins 152 in the second stage (lower stage) are made in a state of being attached to the upper face of the protruding portion of the dielectric 151.

The perimeter of the dielectric 151 is covered with a square-tube shell 153 opened in the first direction (horizontal direction in FIG. 25(a)). This shell 153 is configured of a conductor and is grounded when used. That is to say, this shell 153 makes up a grounding conductor. Note that this shell 153 is extended at the edge portion of the dielectric 151 on the connection end side with the plug 250C, and the protruding portion of the dielectric 151 where the signal electrode pins 152 are attached to the upper face and lower face is covered by these extended portions.

In this receptacle 150C, the shell 153 is thickly formed, except for the insertion portion of the plug 250C as compared with the structure of the current HDMI connector illustrated in FIG. 20. Thereby, distance between each signal electrode pin 152 of the first stage (upper stage), each signal electrode pin 152 of the second stage (lower stage), and the shell 153 is shortened. Therefore, each signal electrode pin 152 is coupled to the shell 153, and the differential signal is transmitted with single end. That is to say, the electromagnetic field of the transmitting signal is coupled so as to be distributed between each of signal electrode pin 152 and the shell 153, so each signal electrode pin 152 is placed close to the shell 153 and the differential signals are transmitted with single end.

In the improved structure example 3 of the HDMI connector illustrated in FIG. 25, the signal electrode pins 252 and 152 of the plug 250C and receptacle 150C are coupled with the shells 253 and 153, and differential signals are transmitted with single end. Accordingly, even in the event that a pair of signal electrode pins P1 and P2 transmitting differential signals are in a state of not being coupled or in a state with no corresponding signal electrode pin for shielding, crosstalk from other signal electrode pins can be reduced, and transmission of signal with high quality is enabled.

In this case, as illustrated in FIG. 21(c), each of a pair of the signal electrode pins P1 and P2 transmitting differential signals, are coupled with the shell. Therefore, in each of the pair of the signal electrode pins P1 and P2, interference between the other signal electrode pin greatly decreases with regard to electromagnetic field, that is to say, crosstalk from the other signal electrode pin greatly decreases, and transmission of signal with high quality is enabled.

FIG. 27(d) illustrates data observation waveforms of the TMDS channels #0, #4, and #1 at the output side of the plug 250C in the event that data of 4 Gbps is transmitted at each of the TMDS channels #0 to #5 through the receptacle 150C and plug 250C. It can be seen that waveform deterioration is greatly improved with the data observation waveforms of the TMDS channels #0, #4, and #1 illustrated in FIG. 27(d) as compared with the data observation waveforms according to the current HDMI connector structure, illustrated in FIG. 27(a) described above.

FIG. 28(d) illustrates crosstalk observation waveforms observed in a pair of the signal electrode pins P1 and P2 of the TMDS channel #4. In this case, observation was made in a state of transmitting 4 Gbps data in each of the TMDS channels #0 to #3, and #5 through the receptacle 150C and plug 250C, excluding the TMDS channel #4. It can be seen that the level becomes much smaller for the crosstalk observation waveforms of the TMDS channel #4 illustrated in FIG. 28(b), as compared with the crosstalk observation waveform of the current HDMI connector structure, illustrated in FIG. 28(a) described above.

[Improved Structure Example 4]

Figure 26:
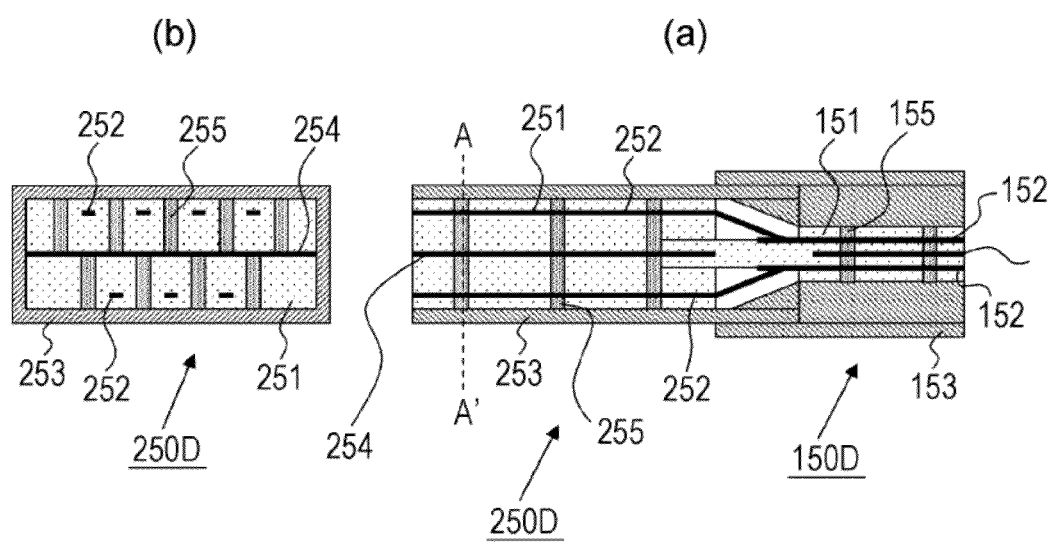
FIG. 26 is a diagram schematically illustrating an improved structure example 4 of the HDMI connector (plug and receptacle).

FIG. 26 schematically illustrates improved structure example 4 of the HDMI connector (plug, receptacle). FIG. 26(a) is a longitudinal cross-sectional view indicating the state where the plug 250D connected to the end portion of the cable 200 and the receptacle 150D included in the source device (transmission device) 110 or sink device (reception device) 120 has been connected. FIG. 26(b) is a transverse cross-sectional view along line A-A' in FIG. 26(a), i.e., a transverse cross-sectional view of the plug 250D. In this FIG. 26, portions corresponding to FIG. 25 are denoted with the same reference numerals and further description will be omitted, as appropriate.

The plug 250D has a dielectric 251, signal electrode pins 252, a shell 253, ground plane 254, and vias (via) 255. With this plug 250D, a thin-plate ground plane 254 is disposed in the dielectric 251. This ground plane 254 is arrayed between multiple signal electrode pins 252 on the first stage (upper stage) and multiple signal electrode pins 252 on the second stage (lower stage). This ground plane 254 is configured of a conductor and grounded when being used. For example, this ground plane 254 is electrically connected to the shell 253 in the above-described third direction (horizontal direction in FIG. 26(b)).

Also, with this plug 250D, in the dielectric 251, vias 255 electrically connecting the ground plane 254 and shell 253, i.e., plating holes, are formed. The vias 255 are formed between each signal electrode pin 252 on the first stage (upper stage) and each signal electrode pin 252 on the second stage (lower stage). While further description will be omitted, other structures of the plug 250D are made to be the same as those of the plug 250C in the improved configuration example 3 illustrated in FIG. 25.

Also, the receptacle 150D has a dielectric 151, signal electrode pins 152, a shell 153, a ground plane 154, and vias (via) 155. With this receptacle 150D, the thin-plate ground plane 154 is disposed in the dielectric 151. This ground plate 154 is formed between multiple signal electrode pins 152 on the first stage (upper stage) and multiple signal electrode pins 152 on the second stage (lower stage). This ground plane 154 is configured of a conductor and grounded when being used. For example, this ground plane 154 is electrically connected to the shell 153 in the above-described third direction (horizontal direction in FIG. 26(b)).

With this plug 150D, in the dielectric 151, vias 155 electrically connecting the ground plane 154 and shell 153, i.e., plating holes, are formed. The vias 155 are formed between each signal electrode pin 152 on the first stage (upper stage) and each signal electrode pin 152 on the second stage (lower stage). While further description will be omitted, other structures of the receptacle 150D are made to be the same as those of the receptacle 150C in the improved configuration example 3 illustrated in FIG. 25.

In the improved structure example 4 of the HDMI connector illustrated in FIG. 26, as with the improved configuration example 3 in FIG. 25, each of the signal electrode pins 252 and 152 of the plug 250D and receptacle 150D is coupled to the shells 253 and 153, and the differential signals are transmitted with single end. Accordingly, even in the event that a pair of signal electrode pins P1 and P2 transmitting differential signals are in a state of not being coupled or in a state with no corresponding signal electrode pin for shielding, crosstalk from other signal electrode pins can be reduced.

Also, with this improved structure example 4, the grounding planes 254 and 154 are disposed in the dielectrics 251 and 151 of the plug 250D and receptacle 150D. Accordingly, at the plug 250D and receptacle 150D, the first stage (upper stage) signal electrode pins 252 and 152, and the second stage (lower stage) signal electrode pins 252 and 152, are divided by these grounding planes 254 and 154, so crosstalk therebetween is reduced.

Further, with this improved structure example 4, the vias 255 and 155 are formed in the dielectrics 251 and 151 of the plug 250D and receptacle 150D. Accordingly, crosstalk between the signal electrode pins 252 and 152 of each stage is reduced in the plug 250D and receptacle 150D. Accordingly, with this improved structure example 4, in a pair of signal electrode pins transmitting differential signals, crosstalk from other signal electrode pins can be further reduced than the improved structure example 3 illustrated in the above-described FIG. 25, and transmission of even higher quality signals is enabled.

FIG. 27(e) illustrates data observation waveforms of the TMDS channels #0, #4, and #1 at the output side of the plug 250B in the event of transmitting 4 Gbps data through the receptacle 150D and plug 250D in each of the TMDS channels #0 through #5. It can be seen that waveform deterioration is further improved for the data observation waveforms of the TMDS channels #0, #4, and #1 illustrated in FIG. 27(e), as compared with the data observation waveforms illustrated in FIG. 27(d) of the above-described improved structure example 3(see FIG. 25).

FIG. 28(e) illustrates crosstalk observation waveforms observed in a pair of the signal electrode pins P1 and P2 of the TMDS channel #4. In this case, observation was made in a state of transmitting 4 Gbps data in each of the TMDS channels #0 to #3, and #5 through the receptacle 150D and plug 250D, excluding the TMDS channel #4. It can be seen that the level becomes even smaller for the crosstalk observation waveforms of the TMDS channel #4 illustrated in FIG. 28(e) as compared with the crosstalk observation waveforms of the above-described improved structure example 3 illustrated in FIG. 28(d) (see FIG. 25).

Note that, with the improved structure example 2 and 4 of HDMI connector illustrated in FIG. 24 and FIG. 26, in the plugs 250B and 250D and receptacles 150B and 150D, the ground planes 254 and 154 and shell 253 and 153 are electrically connected with the vias 255 and 155. Therefore, as compared with the improved structure examples 1 and 3 illustrated in FIG. 23 and FIG. 25, the return path of the same-phase components can be greatly shortened, thereby preventing a major inconsistency regarding the differential signals.

FIG. 29(a) illustrates a case where the vias are not formed, as with the improved structure examples 1 and 3 illustrated in FIG. 23 and FIG. 25. In this case, the return path of the same-phase components as to the differential signals (D+ D−) follows a detour along the shell, which is a major inconsistency regarding the differential signals (D+ D−). Conversely, FIG. 29(b) illustrates a case where the vias are formed, as with the improved structure examples 2 and 4 illustrated in FIG. 24 and FIG. 26. In this case, the return path of the same-phase components as to the differential signals (D+ D−) follows a shortened route through the vias and ground plate. Accordingly, with the improved structure example 4 illustrated in FIG. 26 in particular, transmission signal quality approximately equivalent to that of the current HDMI transmission can be ensured.

[Manufacturing Technique Example of Modified Structure Connector]

Next, one example of a manufacturing technique of the modified structure connector will be described. Note that description will be made regarding the manufacturing technique of the connector (see FIG. 26) of the modified structure example 4. Connectors of the modified structure examples 1 through 3(see FIG. 23 through FIG. 25) can be manufactured in the same way as with the connector of the modified structure example 4, so description will be omitted.

Figure 30:
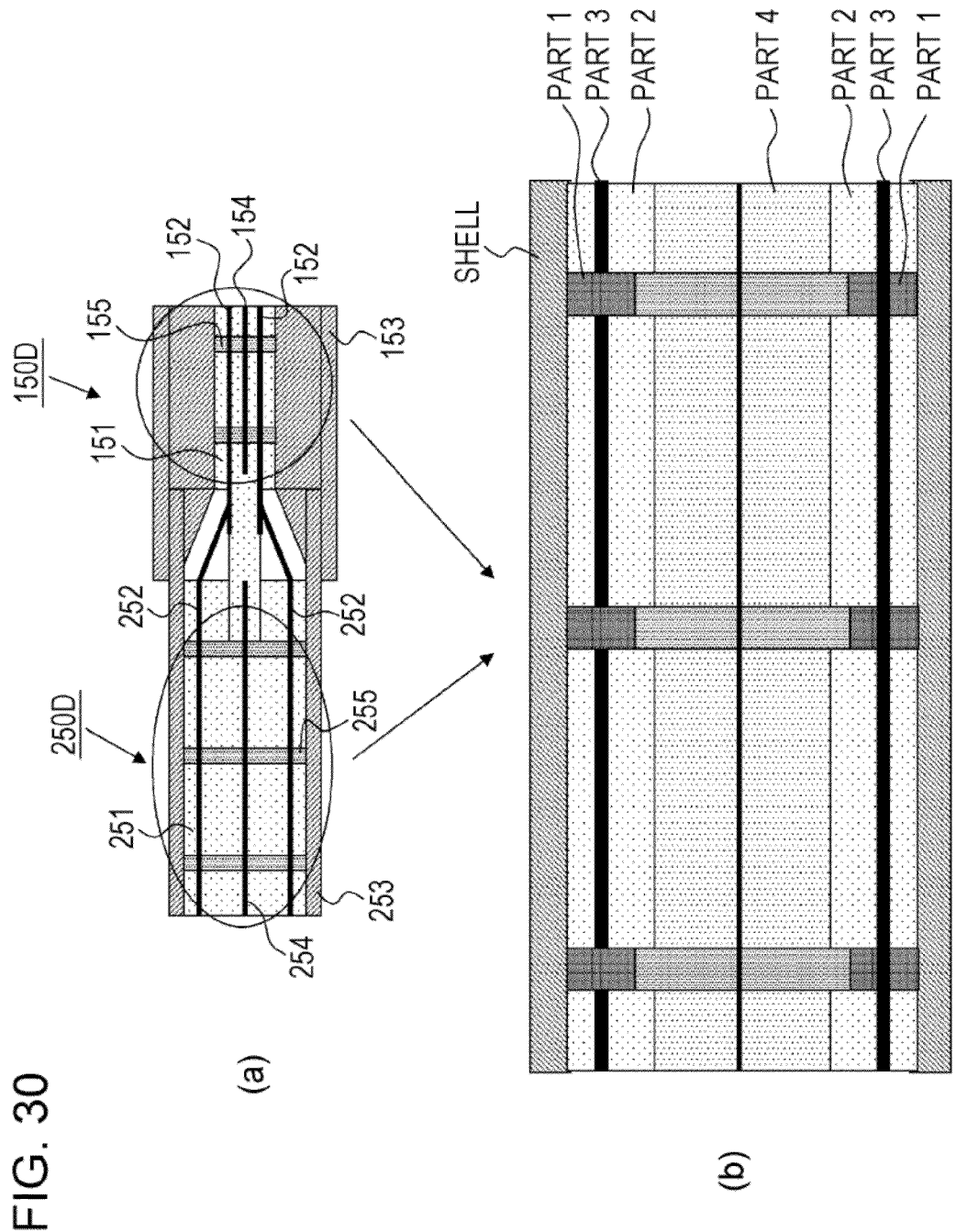
FIG. 30 is a diagram describing a manufacturing method of a modified structure connector.
Figure 31:
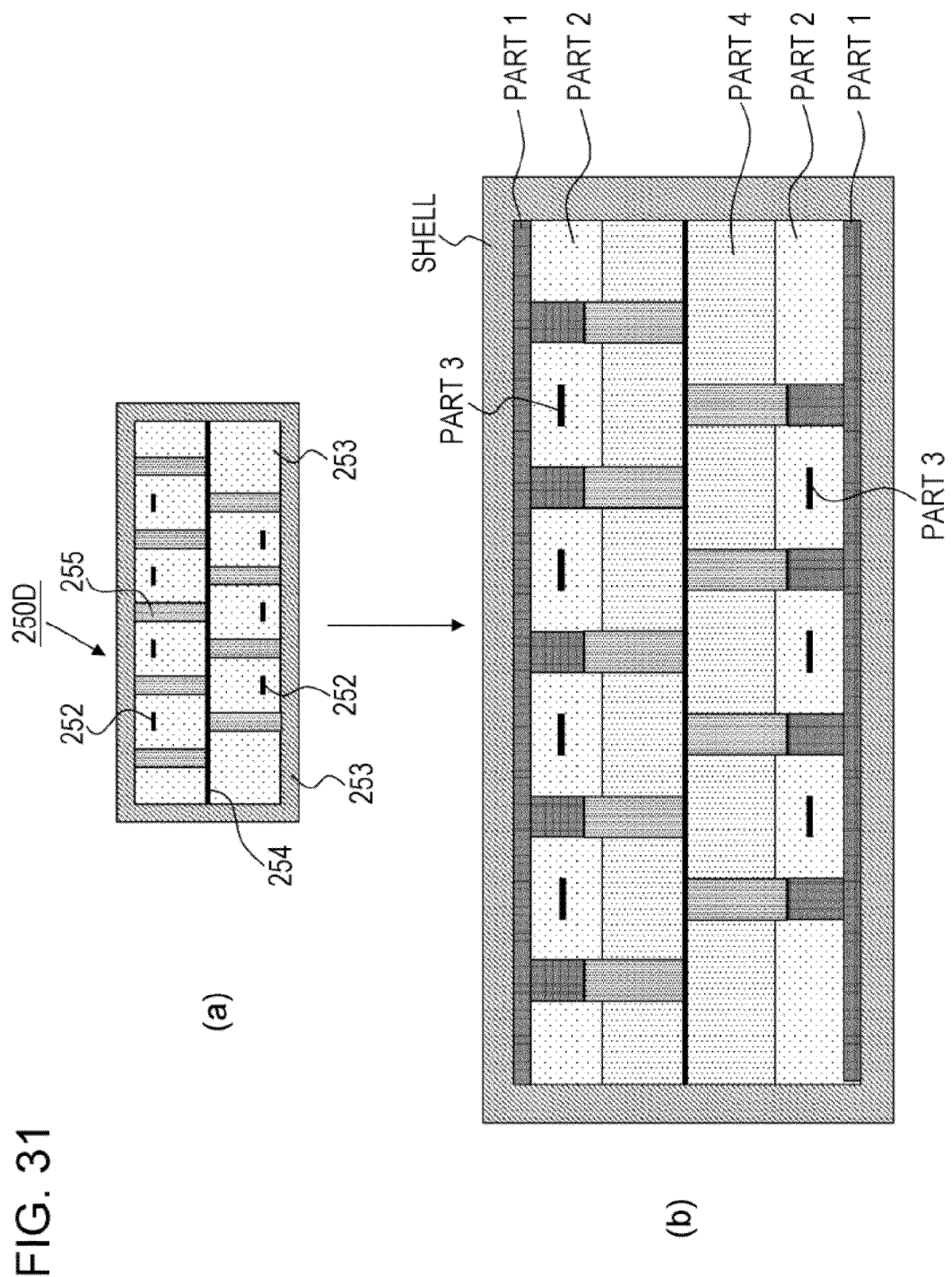
FIG. 31 is a diagram describing a manufacturing method of a modified structure connector.

FIG. 30(a) is, the same as with FIG. 26(a), a longitudinal cross-sectional view illustrating a state where the plug 250D and receptacle 150D have been connected. FIG. 31(a) is, similar to FIG. 26(b), a transverse cross-sectional view of the plug 250D. The connector (plug 250D and receptacle 150D) of the modified structure example 4 is of a structure where the inside of the shell is divided into four types of parts, of part 1 through part 4, as illustrated in FIG. 30(b) and FIG. 31(b). That is to say, the inside of the shell is manufactured by combining these part 1 through part 4.

Figure 32:
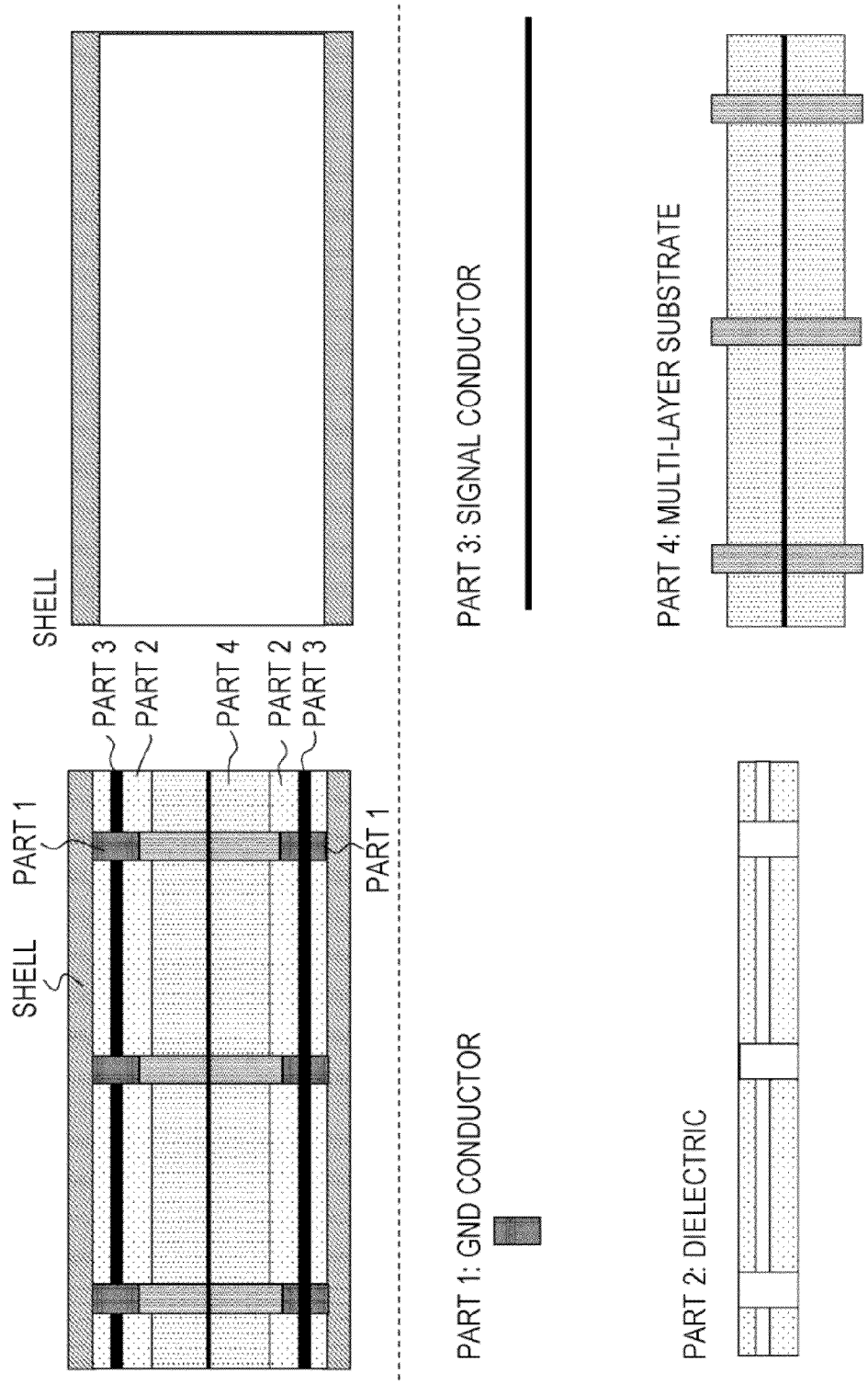
FIG. 32 is a diagram describing a manufacturing method of a modified structure connector.
Figure 33:
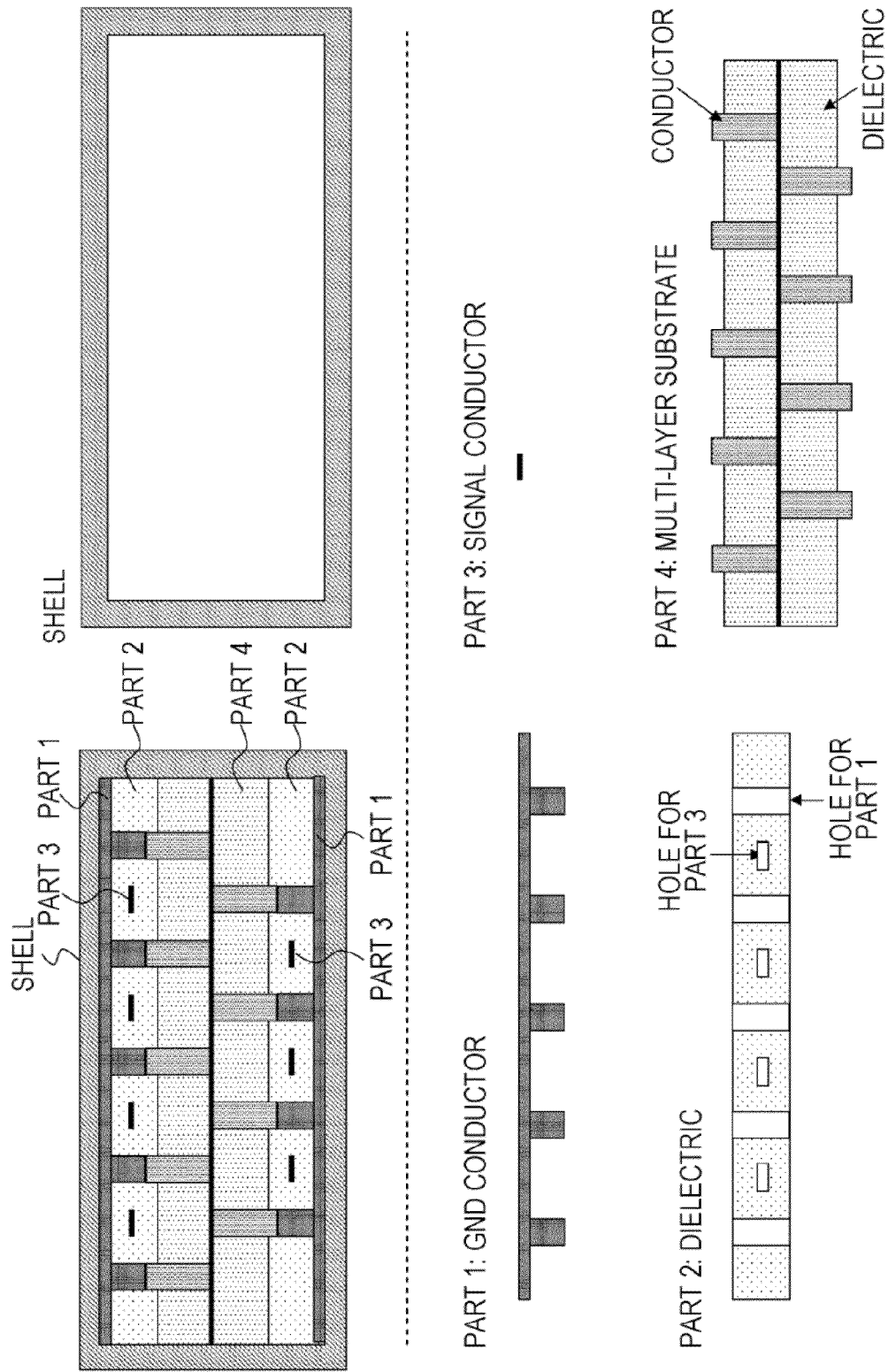
FIG. 33 is a diagram describing a manufacturing method of a modified structure connector.

The part 1 is a conductor (GND conductor) connecting an electrode of the part 4 to the shell as illustrated in FIG. 32 and FIG. 33. Also, the part 2 is a dielectric with a hole for inserting the part 1 and part 3, as illustrated in FIG. 32 and FIG. 33. Also, the part 3 is a signal electrode pin, as illustrated in FIG. 32 and FIG. 33. Also, the part 4 is a multilayer substrate to connect upper and lower shell via the part 1, as illustrated in FIG. 32 and FIG. 33.

As described above, by dividing the inside of the shell into four kinds of parts, of part 1 through part 4, and manufacturing by combining these, allows easy manufacturing of a connector (plug 250D and receptacle 150D).

As described above, with the AV system 100 illustrated in FIG. 1, the data transmission unit 112 of the source device 110 has the operation mode of the new HDMI mode besides the current HDMI operation mode. Here, differential signal channels to transmit digital signal such as video data are 3 channels in the current HDMI, but 6 channels in the new HDMI. Therefore, signal transmission with a high data rate is enabled by the new HDMI being used. Also, when the sink device 120 and cable 200 are not compatible with the new HDMI, backward compatibility is ensured by the current HDMI (conventional HDMI) being used.

<2. Modification>

Note that, with the above embodiment, the shape of the plug of the new HDMI cable has been illustrated as being the same as the shape of the plug of the current HDMI cable (conventional HDMI cable). However, an arrangement may be made where the shape of the plug of the new HDMI is different from the shape of the plug of the current HDMI cable, so that when one of the source device and sink device is not compatible with the new HDMI, these cannot be connected with a new HDMI cable.

Figure 34:
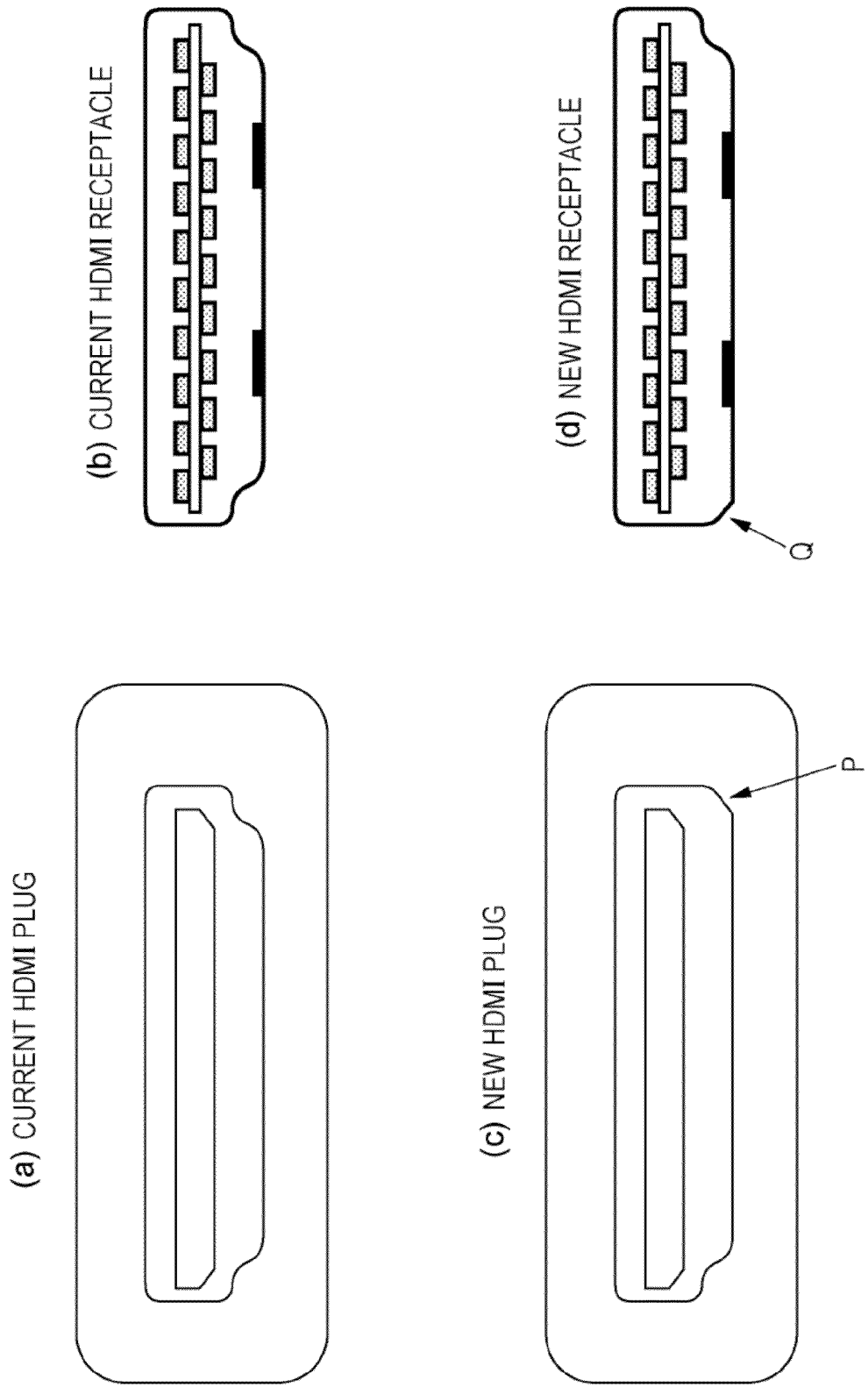
FIG. 34 is a diagram describing another example of the shape of the cable plug of the new HDMI the receptacle of the new HDMI.

FIG. 34(*a*) illustrates a shape of the plug of the current HDMI cable and a shape of the receptacle of the source device or sink device compatible only with the current HDMI. In contrast, FIG. 34(*c*) illustrates the shape of the plug of new HDMI cable and FIG. 34(*d*) illustrates an example of the shape of the receptacle of the source device or sink device compatible with the new HDMI. Note that FIG. 35(*a*) is a perspective view of the plug of the current HDMI cable and FIG. 35(*b*) is a perspective view of the plug of the new HDMI.

A protruding portion is provided to the plug of the new HDMI cable (indicated by arrow P). Receptacles of the source device and sink device compatible with to the new HDMI are provided with a recessed portion corresponding to the protruding portion of plug (indicated by arrow Q). In this case, the shapes of the receptacles of the source device and sink device compatible with to the new HDMI match the shape of the plug of the new HDMI cable, and the shape of the plug of the current HDMI cable is encompassed.

Setting the shape of the plug of the new HDMI cable and the shape of the receptacles of the source device and sink device compatible with the new HDMI so as to be such as described above enables the new HDMI cable to connect to the receptacles of source device and sink device compatible with the new HDMI. However, the new HDMI cannot be connected to the receptacles of a source device or sink device compatible with the current HDMI alone. Thus, in the event that one of the source device and sink device is not compatible with the new HDMI, these will no longer be connected with the new HDMI cable. That is to say, only when both of the source device and sink device are compatible with the new HDMI, these connection thereof can be realized with the new HDMI cable.

As described above, the shapes of the receptacles of the source device and sink device compatible with the new HDMI match the shape of the plug of the new HDMI cable, and the shape of the plug of the current HDMI cable is encompassed. Therefore, the current HDMI cable can be connected to not only the receptacles of the source device and sink device compatible only with the current HDMI, but also the receptacles of the source device and sink device compatible with the new HDMI.

Also, with the above embodiment, we have illustrated differential signal channels being six channels as the new HDMI, as compared to differential signal channels being three channels to transmit digital signals such as video data in the current HDMI. However, the number of the differential signal channels employed to transmit digital signals such as video data can be conceived to be four channels, five channels, and further, seven channels or the like. For example, differential signal channels to transmit digital signals such as video data may be arranged to be five channels, and the clock frequency speeded up to around 1.2 times, which will result in obtaining data transfer speed equivalent to a case of six channels.

Also, with the above embodiment, this invention has been applied to the AV system where a source device and sink device are connected with an HDMI standard digital interface. This invention is similarly applicable to AV systems connected with other similar digital interfaces.

Industrial Applicability

This invention is applicable to AV systems made up by connecting a source device to a sink device via a digital interface.

REFERENCE SIGNS LIST

81 HDMI transmitter
82 HDMI receiver
100 AV system
110 source device
111 receptacle
112 data transmission unit
113 control unit
120 sink device
121 receptacle
122 data reception unit
123 control unit
150, 150A through 150D plug
151 dielectric
152 signal electrode pin
153 shell
154 ground plane
155 via
200 cable
201, 202 plug
250, 250A through 250D receptacle
251 dielectric
252 signal electrode pin
253 shell
254 ground plane
255 via

The invention claimed is:

1. A connector comprising:
a plurality of signal electrode pins which are disposed within a cuboid-shaped dielectric and which correspond to differential signals of a predetermined number of channels and extend in a first direction which is a predetermined axial direction of the cuboid, with the perimeter of the dielectric being covered by a square-tube grounding conductor opened in the first direction;
wherein each of the signal electrode pins is arrayed nearer one side of opposing first and second sides of the grounding conductor than a plane in the first direction disposed centrally between the opposing first and second sides so as to couple with the grounding conductor, and differential signals are transmitted with single end.

2. The connector according to claim 1,
wherein the plurality of signal electrode pins corresponding to the differential signals of the predetermined number of channels are arrayed being divided into a first stage and a second stage, in a second direction orthogonal to the first direction;
and wherein the plurality of signal electrode pins of each stage are arrayed with a predetermined interval in a third direction orthogonal to the first direction and second direction;

and wherein a ground plane is disposed between the plurality of signal electrode pins of the first stage and the plurality of signal electrode pins of the second stage within the dielectric, and connecting conductors electrically connecting the ground plane and the grounding conductor are disposed between each of the signal electrode pins of each of the stages within the dielectric.

3. A connector comprising:

a plurality of signal electrode pins which are disposed within a cuboid-shaped dielectric and which correspond to differential signals of a predetermined number of channels and extend in a first direction which is a predetermined axial direction of the cuboid, with the perimeter of the dielectric being covered by a square-tube grounding conductor opened in the first direction;

wherein the plurality of signal electrode pins corresponding to the differential signals of the predetermined number of channels are arrayed being divided into a first stage and a second stage, in a second direction orthogonal to the first direction;

and wherein the plurality of signal electrode pins of each stage are arrayed with a predetermined interval in a third direction orthogonal to the first direction and second direction;

and wherein a ground plane is disposed between the plurality of signal electrode pins of the first stage and the plurality of signal electrode pins of the second stage within the dielectric, and connecting conductors electrically connecting the ground plane and the grounding conductor are disposed extending in the second direction from the ground plane to the grounding conductor between each of the signal electrode pins of each of the stages within the dielectric.

4. A cable, which transmits digital signals by differential signals of a predetermined number of channels from a transmission device to a reception device, the cable comprising:

a plug on an end;

wherein the plug is configured of a plurality of signal electrode pins which are disposed within a cuboid-shaped dielectric and which correspond to differential signals of a predetermined number of channels and extend in a first direction which is a predetermined axial direction of the cuboid, with the perimeter of the dielectric being covered by a square-tube grounding conductor opened in the first direction;

and wherein each of the signal electrode pins is arrayed nearer one side of opposing first and second sides of the grounding conductor than a plane in the first direction disposed centrally between the opposing first and second sides so as to couple with the grounding conductor, and differential signals are transmitted with single end.

5. The cable according to claim 4, wherein the plurality of signal electrode pins corresponding to the differential signals of the predetermined number of channels are arrayed being divided into a first stage and a second stage, in a second direction orthogonal to the first direction;

and wherein the plurality of signal electrode pins of each stage are arrayed with a predetermined interval in a third direction orthogonal to the first direction and second direction;

and wherein a ground plane is disposed between the plurality of signal electrode pins of the first stage and the plurality of signal electrode pins of the second stage within the dielectric, and connecting conductors electrically connecting the ground plane and the grounding conductor are disposed between each of the signal electrode pins of each of the stages within the dielectric.

6. A cable, which transmits digital signals by differential signals of a predetermined number of channels from a transmission device to a reception device, the cable comprising:

a plug on an end;

wherein the plug is configured of a plurality of signal electrode pins which are disposed within a cuboid-shaped dielectric and which correspond to differential signals of a predetermined number of channels and extend in a first direction which is a predetermined axial direction of the cuboid, with the perimeter of the dielectric being covered by a square-tube grounding conductor opened in the first direction, and the plurality of signal electrode pins corresponding to the differential signals of the predetermined number of channels are arrayed being divided into a first stage and a second stage, in a second direction orthogonal to the first direction;

and wherein the plurality of signal electrode pins of each stage are arrayed with a predetermined interval in a third direction orthogonal to the first direction and second direction;

and wherein a ground plane is disposed between the plurality of signal electrode pins of the first stage and the plurality of signal electrode pins of the second stage within the dielectric, and connecting conductors electrically connecting the ground plane and the grounding conductor are disposed extending in the second direction from the ground plane to the grounding conductor between each of the signal electrode pins of each of the stages within the dielectric.

7. A transmission device, comprising:

a digital signal transmission unit which transmits digital signals to an external device by differential signals via a cable, having a first operation mode of which the number of channels of the differential signals is a first number, and a second operation mode of which the number of channels of the differential signals is a second number greater than the first number;

an operation mode determining unit which determines whether or not the external device and the cable are compatible with the second operation mode;

an operation control unit which controls operation of the digital signal transmission unit based on determination by the operation mode determining unit; and a receptacle having a plurality of signal electrode pins for connecting a plug of the cable;

wherein the digital signal transmission unit selects a first pin assignment in the first operation mode, and in the second operation mode selects a second pin assignment which differs from the first pin assignment, in which a terminal used as a shield terminal corresponding to a signal terminal of digital signal and/or clock signal differential signals in the first pin assignment, is used as a signal terminal for differential signals to transmit digital signals;

and wherein the receptacle is configured of the plurality of signal electrode pins which are disposed within a cuboid-shaped dielectric and extend in a first direction which is a predetermined axial direction of the cuboid, with the perimeter of the dielectric being covered by a square-tube grounding conductor opened in the first direction;

and wherein each of the signal electrode pins is arrayed near the grounding conductor so as to couple with the grounding conductor, and differential signals are transmitted with single end.

8. The transmission device according to claim 7,
wherein the plurality of signal electrode pins are arrayed being divided into a first stage and a second stage, in a second direction orthogonal to the first direction;
and wherein the plurality of signal electrode pins of each stage are arrayed with a predetermined interval in a third direction orthogonal to the first direction and second direction;
and wherein a ground plane is disposed between the plurality of signal electrode pins of the first stage and the plurality of signal electrode pins of the second stage within the dielectric, and connecting conductors electrically connecting the ground plane and the grounding conductor are disposed between each of the signal electrode pins of each of the stages.

9. A transmission device, comprising:
a digital signal transmission unit which transmits digital signals to an external device by differential signals via a cable, having a first operation mode of which the number of channels of the differential signals is a first number, and a second operation mode of which the number of channels of the differential signals is a second number greater than the first number;
an operation mode determining unit which determines whether or not the external device and the cable are compatible with the second operation mode;
an operation control unit which controls operation of the digital signal transmission unit based on determination by the operation mode determining unit; and
a receptacle having a plurality of signal electrode pins for connecting a plug of the cable;
wherein the digital signal transmission unit selects a first pin assignment in the first operation mode, and in the second operation mode selects a second pin assignment which differs from the first pin assignment, in which a terminal used as a shield terminal corresponding to a signal terminal of digital signal and/or clock signal differential signals in the first pin assignment, is used as a signal terminal for differential signals to transmit digital signals;
and wherein the receptacle is configured of the plurality of signal electrode pins which are disposed within a cuboid-shaped dielectric and extend in a first direction which is a predetermined axial direction of the cuboid, with the perimeter of the dielectric being covered by a square-tube grounding conductor opened in the first direction;
and wherein the plurality of signal electrode pins are arrayed being divided into a first stage and a second stage, in a second direction orthogonal to the first direction;
and wherein the plurality of signal electrode pins of each stage are arrayed with a predetermined interval in a third direction orthogonal to the first direction and second direction;
and wherein a ground plane is disposed between the plurality of signal electrode pins of the first stage and the plurality of signal electrode pins of the second stage within the dielectric, and connecting conductors electrically connecting the ground plane and the grounding conductor are disposed between each of the signal electrode pins of each of the stages within the dielectric.

10. A reception device, comprising:
a digital signal reception unit which receives digital signals from an external device by differential signals via a cable, having a first operation mode of which the number of channels of the differential signals is a first number, and a second operation mode of which the number of channels of the differential signals is a second number greater than the first number;
an information reception unit which receives operation mode information from the external device regarding which of the first operation mode and the second operation mode to select;
an operation control unit which controls operation of the digital signal transmission unit based the operation mode information received by the information reception unit; and
a receptacle having a plurality of signal electrode pins for connecting a plug of the cable;
wherein the information reception unit selects a first pin assignment in the first operation mode, and in the second operation mode selects a second pin assignment which differs from the first pin assignment, in which a terminal used as a shield terminal corresponding to a signal terminal of digital signal and/or clock signal differential signals in the first pin assignment, is used as a signal terminal for differential signals to transmit digital signals;
and wherein the receptacle is configured of the plurality of signal electrode pins which are disposed within a cuboid-shaped dielectric and extend in a first direction which is a predetermined axial direction of the cuboid, with the perimeter of the dielectric being covered by a square-tube grounding conductor opened in the first direction;
and wherein each of the signal electrode pins is arrayed near the grounding conductor so as to couple with the grounding conductor, and differential signals are transmitted with single end.

11. The reception device according to claim 10,
wherein the plurality of signal electrode pins are arrayed being divided into a first stage and a second stage, in a second direction orthogonal to the first direction;
and wherein the plurality of signal electrode pins of each stage are arrayed with a predetermined interval in a third direction orthogonal to the first direction and second direction;
and wherein a ground plane is disposed between the plurality of signal electrode pins of the first stage and the plurality of signal electrode pins of the second stage within the dielectric, and connecting conductors electrically connecting the ground plane and the grounding conductor are disposed between each of the signal electrode pins of each of the stages.

12. A reception device, comprising:
a digital signal reception unit which receives digital signals from an external device by differential signals via a cable, having a first operation mode of which the number of channels of the differential signals is a first number, and a second operation mode of which the number of channels of the differential signals is a second number greater than the first number;
an information reception unit which receives operation mode information from the external device regarding which of the first operation mode and the second operation mode to select;
an operation control unit which controls operation of the digital signal transmission unit based the operation mode information received by the information reception unit; and
a receptacle having a plurality of signal electrode pins for connecting a plug of the cable;

wherein the information reception unit selects a first pin assignment in the first operation mode, and in the second operation mode selects a second pin assignment which differs from the first pin assignment, in which a terminal used as a shield terminal corresponding to a signal terminal of digital signal and/or clock signal differential signals in the first pin assignment, is used as a signal terminal for differential signals to transmit digital signals;

and wherein the receptacle is configured of the plurality of signal electrode pins which are disposed within a cuboid-shaped dielectric and extend in a first direction which is a predetermined axial direction of the cuboid, with the perimeter of the dielectric being covered by a square-tube grounding conductor opened in the first direction;

and wherein the plurality of signal electrode pins are arrayed being divided into a first stage and a second stage, in a second direction orthogonal to the first direction;

and wherein the plurality of signal electrode pins of each stage are arrayed with a predetermined interval in a third direction orthogonal to the first direction and second direction;

and wherein a ground plane is disposed between the plurality of signal electrode pins of the first stage and the plurality of signal electrode pins of the second stage within the dielectric, and connecting conductors electrically connecting the ground plane and the grounding conductor are disposed between each of the signal electrode pins of each of the stages.

13. A manufacturing method of a connector, configured of a plurality of signal electrode pins which are disposed within a cuboid-shaped dielectric and which correspond to differential signals of a predetermined number of channels and extend in a first direction which is a predetermined axial direction of the cuboid, with the perimeter of the dielectric being covered by a square-tube grounding conductor opened in the first direction, the method comprising:

the plurality of signal electrode pins being arrayed divided into a first stage and a second stage, in a second direction orthogonal to the first direction, the plurality of signal electrode pins of each stage being arrayed with a predetermined interval in a third direction orthogonal to the first direction and second direction, each of the signal electrode pins being arrayed nearer one side of opposing first and second sides of the grounding conductor than a plane in the first direction disposed centrally between the opposing first and second sides so as to couple with the grounding conductor, and a signal transmission mode being single mode, and a ground plane being disposed between the plurality of signal electrode pins of the first stage and the plurality of signal electrode pins of the second stage within the dielectric, and connecting conductors electrically connecting the ground plane and the grounding conductor being disposed between each of the signal electrode pins of each of the stages within the dielectric;

wherein the inside of the grounding conductor is manufactured by combining a plurality of parts.

14. A manufacturing method of a connector, configured of a plurality of signal electrode pins which are disposed within a cuboid-shaped dielectric and which correspond to differential signals of a predetermined number of channels and extend in a first direction which is a predetermined axial direction of the cuboid, with the perimeter of the dielectric being covered by a square-tube grounding conductor opened in the first direction, the method comprising:

the plurality of signal electrode pins being arrayed divided into a first stage and a second stage, in a second direction orthogonal to the first direction, the plurality of signal electrode pins of each stage being arrayed with a predetermined interval in a third direction orthogonal to the first direction and second direction, each of the signal electrode pins being arrayed near the grounding conductor so as to couple with the grounding conductor, and a signal transmission mode being single mode, and a ground plane being disposed between the plurality of signal electrode pins of the first stage and the plurality of signal electrode pins of the second stage within the dielectric, and connecting conductors electrically connecting the ground plane and the grounding conductor being disposed between each of the signal electrode pins of each of the stages within the dielectric;

wherein the inside of the grounding conductor is manufactured by combining a plurality of parts, wherein the plurality of parts is a multi-layer substrate having the ground plane, a conductor making up the grounding conductor, for connecting the ground plane of the multi-layer substrate to the grounding conductor, the signal electrode pins, and a dielectric having holes into which the signal electrode pins and the conductor are inserted, disposed between the multi-layer substrate and the grounding conductor.

* * * * *